United States Patent
Mikami

(10) Patent No.: US 9,143,284 B2
(45) Date of Patent: Sep. 22, 2015

(54) RECEIVING APPARATUS, RECEIVING METHOD, AND NON-TRANSITORY COMPUTER READABLE STORAGE MEDIUM

(75) Inventor: Junya Mikami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 827 days.

(21) Appl. No.: 13/435,318

(22) Filed: Mar. 30, 2012

(65) Prior Publication Data

US 2012/0236910 A1    Sep. 20, 2012

Related U.S. Application Data

(63) Continuation of application No. PCT/JP2009/069801, filed on Nov. 24, 2009.

(51) Int. Cl.
*H04B 1/38*    (2015.01)
*H04L 1/18*    (2006.01)

(52) U.S. Cl.
CPC .................... *H04L 1/1829* (2013.01)

(58) Field of Classification Search
CPC ............ H04B 1/40; H04B 3/23; H04B 1/403; H04L 27/2601; H04L 1/0025; H04L 1/1829
USPC ......................................................... 375/219
See application file for complete search history.

(56) References Cited

U.S. PATENT DOCUMENTS

2002/0196812 A1    12/2002    Yamaguchi et al.
2007/0124657 A1    5/2007    Orio
2009/0132893 A1    5/2009    Miyazaki et al.
2010/0202386 A1*   8/2010    Takaoka et al. ............... 370/329
2011/0004799 A1    1/2011    Shimanuki et al.

FOREIGN PATENT DOCUMENTS

JP    5-304516    11/1993
JP    2002-111637    4/2002

(Continued)

OTHER PUBLICATIONS

Translated Abstract of Published Japanese Patent, JP 05-304516 A, Inventor: Yutaka, I., Publication: Nov. 16, 1993, 1 page.*

(Continued)

*Primary Examiner* — Albert Decady
*Assistant Examiner* — Kyle Vallecillo
(74) *Attorney, Agent, or Firm* — Katten Muchin Rosenman LLP

(57) ABSTRACT

The receiving apparatus retains a split signal, which is obtained by splitting a predetermined signal, in a split signal storing unit. When the receiving apparatus receives a retransmission signal from among split signals stored in the split signal storing unit, the receiving apparatus controls a split signal, for which an error checking result does not indicate an error, such that the split signal is not updated, but controls a split signal, for which the error checking result indicates an error, such that the split signal is updated to a signal created by combining the predetermined signal and the retransmission signal.

7 Claims, 17 Drawing Sheets

(56) References Cited

FOREIGN PATENT DOCUMENTS

| | | | | |
|---|---|---|---|---|
| JP | 2003-8553 | 1/2003 | | |
| JP | 2007-142622 | 6/2007 | | |
| JP | 2008-11460 | 1/2008 | | |
| JP | 2008-17487 | 1/2008 | | |
| JP | 2008-67171 | 3/2008 | | |
| WO | 2008/015742 | 2/2008 | | |
| WO | 2009/005047 | 1/2009 | | |
| WO | 2009/041067 | 4/2009 | | |
| WO | WO2009041067 | * 4/2009 | ............... | H04Q 7/32 |
| WO | 2009/075899 | 6/2009 | | |

OTHER PUBLICATIONS

Notice of Rejection dated Jul. 23, 2013, from corresponding Japanese Application No. 2011-543004.

Notice of Rejection dated Oct. 29, 2013, from corresponding Japanese Application No. 2011-543004.

International Search Report dated Feb. 9, 2010, from corresponding International Application No. PCT/JP2009/069801.

* cited by examiner

|  |  | CODE BLOCK NUMBER | | | | | | | | | |
|---|---|---|---|---|---|---|---|---|---|---|---|
|  |  | #0 | #1 | #2 | #3 | #4 | #5 | #6 | #7 | #8 | #9 |
| HARQ PROCESS NUMBER | #0 | 1 | 0 | 1 | 0 | 1 | 1 | 1 | 0 | 0 | 1 |
|  | #1 | 0 | 1 | 1 | 0 | 0 | 1 | 1 | 1 | 1 | 1 |
|  | #2 | 1 | 1 | 0 | 0 | 0 | 0 | 1 | 0 | 0 | 0 |
|  | #3 | 0 | 0 | 0 | 0 | 0 | 0 | 0 | 0 | 0 | 0 |
|  | #4 | 0 | 0 | 1 | 0 | 1 | 1 | 1 | 1 | 0 | 1 |
|  | #5 | 1 | 1 | 1 | 1 | 1 | 1 | 1 | 1 | 1 | 1 |
|  | #6 | 1 | 1 | 1 | 1 | 1 | 1 | 1 | 1 | 1 | 1 |
|  | #7 | 0 | 0 | 0 | 1 | 1 | 1 | 0 | 1 | 1 | 1 |

| HARQ PROCESS NUMBER | | | | | | | |
|---|---|---|---|---|---|---|---|
| #0 | #1 | #2 | #3 | #4 | #5 | #6 | #7 |
| CB#0 | CB#0 | CB#0 | CB#0 | CB#0 | CB#0 | CB#0 | CB#0 |
| CB#1 | CB#1 | CB#1 | CB#1 | CB#1 | CB#1 | CB#1 | CB#1 |
| CB#2 | CB#2 | CB#2 | CB#2 | CB#2 | CB#2 | CB#2 | CB#2 |
| CB#3 | CB#3 | CB#3 | CB#3 | CB#3 | CB#3 | CB#3 | CB#3 |
| CB#4 | CB#4 | CB#4 | CB#4 | CB#4 | CB#4 | CB#4 | CB#4 |
| CB#5 | CB#5 | CB#5 | CB#5 | CB#5 | CB#5 | CB#5 | CB#5 |
| CB#6 | CB#6 | CB#6 | CB#6 | CB#6 | CB#6 | CB#6 | CB#6 |
| CB#7 | CB#7 | CB#7 | CB#7 | CB#7 | CB#7 | CB#7 | CB#7 |
| CB#8 | CB#8 | CB#8 | CB#8 | CB#8 | CB#8 | CB#8 | CB#8 |
| CB#9 | CB#9 | CB#9 | CB#9 | CB#9 | CB#9 | CB#9 | CB#9 |

423

| BANK #0 |
| BANK #1 |
| BANK #2 |
| BANK #3 |
| BANK #4 |
| BANK #5 |
| BANK #6 |
| BANK #7 |
| BANK #8 |
| BANK #9 |

441

| BANK NUMBER | HARQ PROCESS NUMBER | CODE BLOCK NUMBER | NUMBER OF CBS OF CRC-OK |
|---|---|---|---|
| #0 | #4 | #0 | 3 |
| #1 | #4 | #1 | 3 |
| #2 | #4 | #2 | 3 |
| #3 | #5 | #1 | 0 |
| #4 | #5 | #2 | 0 |
| #5 | #7 | #2 | 2 |
| #6 | #7 | #3 | 2 |
| #7 | #0 | #0 | 3 |
| #8 | #0 | #1 | 3 |
| #9 | #0 | #3 | 3 |

RECEIVING APPARATUS, RECEIVING METHOD, AND NON-TRANSITORY COMPUTER READABLE STORAGE MEDIUM

CROSS-REFERENCE TO RELATED APPLICATION

This application is a continuation of International Application No. PCT/JP2009/069801, filed on Nov. 24, 2009, the entire contents of which are incorporated herein by reference.

FIELD

The embodiments discussed herein are directed to a receiving apparatus, a receiving method, and a non-transitory computer readable storage medium.

BACKGROUND

A known hybrid automatic repeat request (HARQ) is the standard of a packet retransmission process performed between base stations and mobile terminals. A HARQ is used in, for example, Long Term Evolution (LTE), which is a standard set by the 3rd Generation Partnership Project (3GPP). In the following, transmitters and receiving apparatuses used in a mobile communication system that conform to LTE will be described.

In mobile communication systems that conform to LTE, a transmitter adds an error detection code to data to be transmitted. Furthermore, the transmitter splits the data if the size of the subject data is greater than a predetermined size. In the description below, the split data is sometimes referred to as a "code block". After the transmitter adds, for each code block, the error detection code, the transmitter encodes the code blocks and adds a redundancy code to them. Then, the transmitter couples the encoded code blocks. And then, the transmitter performs, for example, a modulation process on the coupled data stream and transmits the modulated signal to the outside. In the description below, the data to be transmitted by the transmitter is sometimes referred to as a "transport block".

One of the reasons for splitting the transport blocks is that the memory size used by encoders or decoders increases as the size of data to be encoded increases. Accordingly, in general, the size of the data to be encoded is sometimes limited with aim of suppressing any increase in memory size. For example, with LTE, if a turbo code is used as a redundancy code, the upper limit of the size of the data to be encoded is determined to be 6,144 bits.

Furthermore, in mobile communication systems that conform to LTE, if a signal received from the transmitter is greater than a predetermined size, a receiving apparatus splits the received signal into a code block. At this time, the receiving apparatus retains the signal that has been split (hereinafter, referred to as a "split signal") in a predetermined buffer. In the description below, the split signal that is retained in the predetermined buffer described above is sometimes referred to as a "retained signal".

Then, the receiving apparatus performs error correction or decoding on the retained signal and performs error checking on code blocks that are created by the decoding. Then, the receiving apparatus couples the code blocks to create transport blocks and performs the error checking on the transport blocks. If the receiving apparatus detects an error in a transport block, the receiving apparatus sends a request to the transmitter to retransmit the signal. Specifically, the receiving apparatus sends the retransmission request in transport block units. In the description below, if a signal is transmitted to a predetermined signal, the predetermined signal is sometimes referred to as a "retransmission source signal" and the signal that is retransmitted is sometimes referred to as a "retransmission signal".

Furthermore, if the receiving apparatus receives a retransmission signal, the receiving apparatus uses maximum ratio combining to combine the split signal, which is obtained by splitting the retransmission signal, and the retained signal, which is retained in the predetermined buffer. At this time, the receiving apparatus overwrites the combined signal, which is created by being subjected to the maximum ratio combining, in the predetermined buffer. Accordingly, if the receiving apparatus receives the retransmission signal, the combined signal becomes the new retained signal. Then, the receiving apparatus performs error correction, decoding, or error checking on the retained signal subjected to the maximum ratio combining and couples the code blocks that are created by the decoding. Then, the receiving apparatus performs the error checking on the coupled transport blocks. If the receiving apparatus detects an error, the receiving apparatus again sends a request to retransmit the signal to the transmitter.

As described above, because a mobile communication system, such as an LTE mobile communication system, that uses a HARQ uses maximum ratio combining to combine the retransmission signal and the retained signal, the signal to noise ratio (SNR) is high.

Patent Document 1: Japanese Laid-open Patent Publication No. 2003-008553

Patent Document 2: Japanese Laid-open Patent Publication No. 2008-067171

Patent Document 3: Japanese Laid-open Patent Publication No. 2002-111637

However, in the conventional technology described above, there is a problem in that the throughput of the system decreases. In the following, the problem will be described.

The mobile communication systems of the conventional technology described above that use a HARQ perform a retransmission process on signals in transport block units. When the receiving apparatus receives a retransmission signal, the receiving apparatus uses maximum ratio combining to combine the retained signal and the retransmission signal even if an error is not detected in the retained signal. Accordingly, if the receiving apparatus receives, for example, a retransmission signal that contains an error, the receiving apparatus may possibly use the maximum ratio combining to combine the retained signal, in which an error has not been detected, and the retransmission signal, which contains an error. If a signal subjected to the maximum ratio combining in this way contains an error, the receiving apparatus detects an error at the time of error checking performed on a transport block and again sends a request to retransmit the signal to the transmitter. Specifically, the receiving apparatus may possibly send the request to retransmit the signal because the retransmission signal contains an error even though the retained signal does not contain an error. Accordingly, with the conventional mobile communication system described above, throughput may decrease.

To solve the above problem, it is conceivable to perform a retransmission process for each code block; however, with such a method, because the number of retransmission requests transmitted from the receiving apparatus increases, throughput consequently decreases.

SUMMARY

According to an aspect of an embodiment of the invention, a receiving apparatus includes a splitting unit that splits a received signal received from a predetermined transmitter into a predetermined size; a split signal retaining unit that retains split signals obtained by the splitting unit in a split signal storing unit; a split signal checking unit that performs error checking on each of split signals stored in the split signal storing unit; a check result storing unit that stores therein a result of the error checking performed by the split signal checking unit; a combining unit that combines, when a retransmission signal is received, a split signal that is obtained by the splitting unit splitting the retransmission signal and a split signal that is stored in the split signal storing unit; a control unit that performs a signal update control by controlling, among the split signals stored in the split signal storing unit, not to update the split signal for which an error checking result does not indicate an error and by controlling to update the split signal for which an error checking result indicates an error to a combined signal combined by the combining unit; and a retransmission requesting unit that sends, when an error is contained in a split signal stored in the split signal storing unit, a request to the transmitter to retransmit the retransmission signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 8 is a schematic diagram illustrating an example of a CB coupling buffer according to the third embodiment;

DESCRIPTION OF EMBODIMENTS

Preferred embodiments of a receiving apparatus, a receiving method, and a non-transitory computer readable storage medium disclosed in the present invention will be described in detail below with reference to the accompanying drawings. The receiving apparatus, the receiving method, and the non-transitory computer readable storage medium are not limited to the embodiments disclosed in the present invention.

[a] First Embodiment

Figure 1:
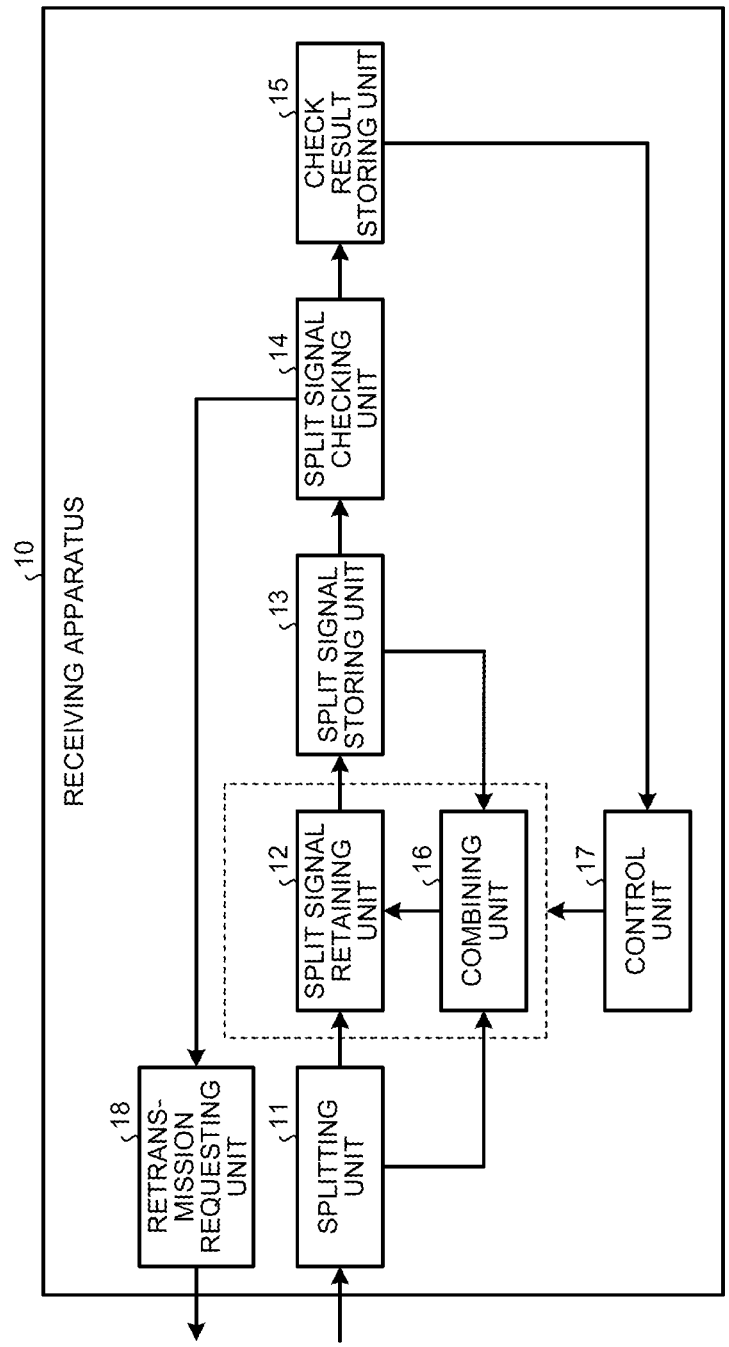
FIG. 1 is a schematic diagram illustrating an example configuration of a receiving apparatus according to a first embodiment.

First, the configuration of the receiving apparatus according to a first embodiment will be described with reference to FIG. 1. FIG. 1 is a schematic diagram illustrating an example configuration of a receiving apparatus 10 according to a first embodiment. As illustrated in FIG. 1, the receiving apparatus 10 according to the first embodiment includes a splitting unit 11, a split signal retaining unit 12, a split signal storing unit 13, a split signal checking unit 14, a check result storing unit 15, a combining unit 16, a control unit 17, and a retransmission requesting unit 18.

The splitting unit 11 splits, into a predetermined size, a signal received from a predetermined transmitter. If the received signal is not a retransmission signal but is a signal that is being received for the first time, the split signal retaining unit 12 retains the split signals that are split by the splitting unit 11 in the split signal storing unit 13. Furthermore, if the received signal is a retransmission signal, the control unit 17, which will be described later, controls the splitting unit 11 such that the splitting unit 11 determines whether a split signal is retained in the split signal storing unit 13.

The split signal checking unit 14 performs, for each split signal, error checking on the split signals stored in the split signal storing unit 13. The check result storing unit 15 stores therein, for each split signal, the results of the error checking performed by the split signal checking unit 14. If the received signal is a retransmission signal, the combining unit 16 combines a split signal, which is obtained by the retransmission signal being split by the splitting unit 11, and a split signal, which is stored in the split signal storing unit 13.

If the received signal is a retransmission signal, the control unit 17 acquires, from the check result storing unit 15, an error checking result of the split signal stored in the split signal storing unit 13. Then, in accordance with the acquired error checking result, the control unit 17 controls whether the split signals stored in the split signal storing unit 13 are updated. Specifically, from among the split signals stored in the split signal storing unit 13, the control unit 17 controls a split signal, for which an error checking result acquired from the check result storing unit 15 does not indicate an error, such that the split signal is not updated. In contrast, from among the split signals stored in the split signal storing unit 13, the control unit 17 controls a split signal, for which an error checking result acquired from the check result storing unit 15 indicates an error, such that the split signal is updated to a signal that is combined by the combining unit 16.

For example, if the error checking result acquired from the check result storing unit 15 does not indicate an error, the control unit 17 controls the split signal retaining unit 12 such that the signal combined by the combining unit 16 is not retained in the split signal storing unit 13. Furthermore, for example, if the error checking result does not indicate an error, the control unit 17 controls the combining unit 16 such that the combining unit 16 does not perform a combining process and also controls the split signal retaining unit 12 such that the split signal retaining unit 12 does not update the split signal storing unit 13.

If an error is contained in the split signal stored in the split signal storing unit 13, which obtained on the basis of the error checking result performed by the split signal checking unit 14, the retransmission requesting unit 18 sends a request to the transmitter to retransmit the signal.

As described above, if the receiving apparatus 10 according to the first embodiment receives a retransmission signal, the receiving apparatus 10 does not update, from among the split signals stored in the split signal storing unit 13, a split signal for which an error checking result does not indicate an error. In contrast, from among the split signals stored in the split signal storing unit 13, the receiving apparatus 10 updates a split signal, for which an error checking result indicates an error, to a signal that is combined by the combining unit 16.

Accordingly, even if the receiving apparatus 10 according to the first embodiment receives a retransmission signal that contains an error, the receiving apparatus 10 does not use a signal that is obtained by combining the retransmission signal that contains an error and the retained signal in which an error has not been detected. Accordingly, the receiving apparatus 10 according to the first embodiment does not perform a retransmission process because of a signal that is obtained by combining the retransmission signal that contains an error and the retained signal in which an error has not been detected. Therefore, with the receiving apparatus 10 according to the first embodiment, when compared with the conventional receiving apparatus, the number of requests sent to the transmitter to retransmit the signal decreases, thus improving the throughput of the mobile communication system.

[b] Second Embodiment

In the following, the receiving apparatus described in the first embodiment will be described using a specific example. In a second embodiment, an example will be described in which the receiving apparatus described in the first embodiment is used in the mobile communication system in which the communication standard is LTE. In the second embodiment, it is assumed that a maximum of eight HARQ processes are performed. Furthermore, in the second embodiment, it is assumed that the transport block is split into a maximum of 10 code blocks.

Configuration of the Mobile Communication System

Figure 2:
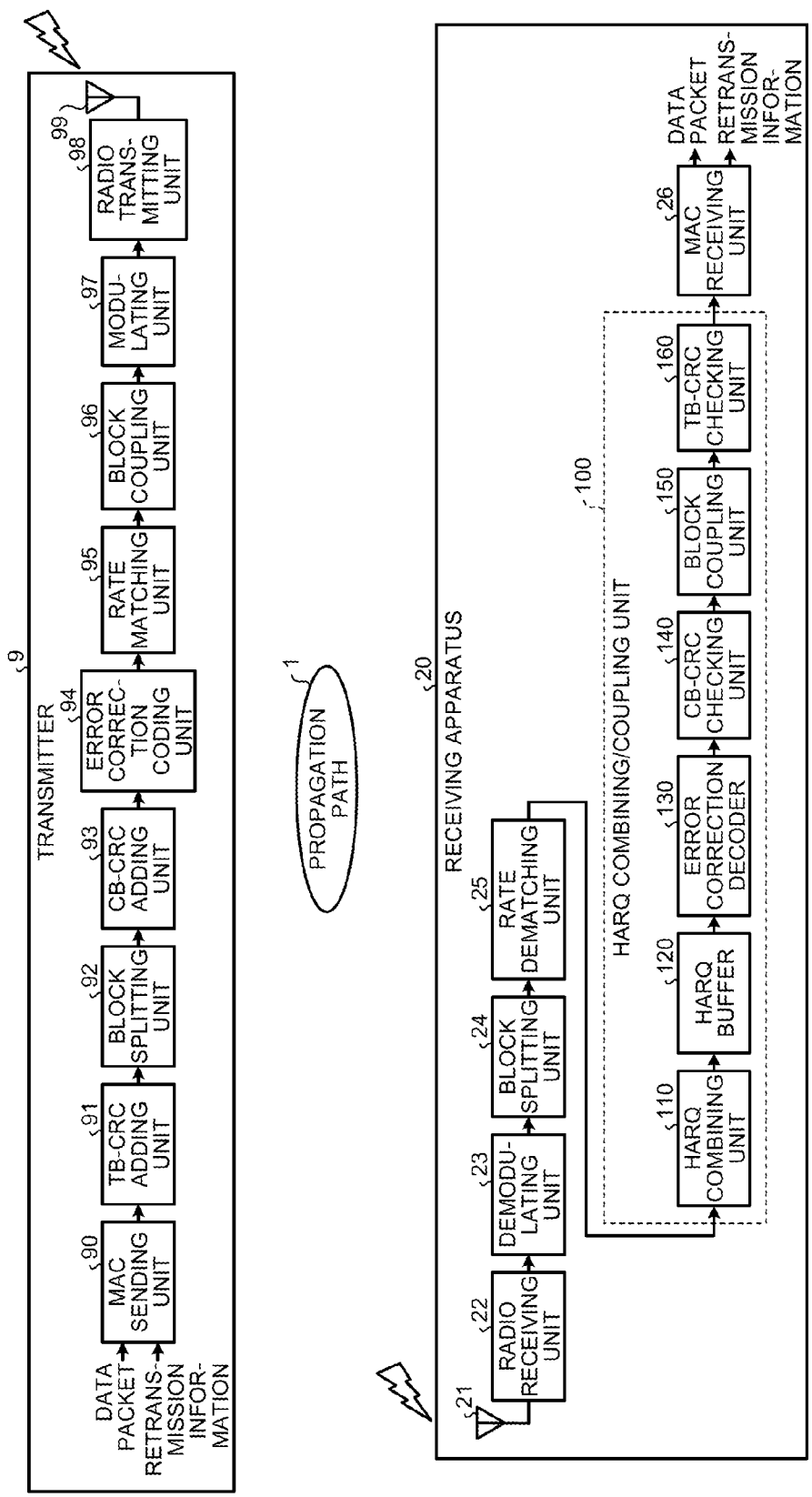
FIG. 2 is a schematic diagram illustrating an example configuration of a mobile communication system that includes a receiving apparatus according to a second embodiment.

First, the configuration of the mobile communication system that includes a receiving apparatus according to the second embodiment will be described with reference to FIG. 2. FIG. 2 is a schematic diagram illustrating an example configuration of a mobile communication system that includes a receiving apparatus according to a second embodiment. Furthermore, FIG. 2 illustrates an example configuration of a transmitter 9 and a receiving apparatus 20 that perform a downlink communication process.

The transmitter 9 and the receiving apparatus 20 illustrated in FIG. 2 perform radio communication via a propagation path 1. As illustrated in FIG. 2, the transmitter 9 includes a media access control (MAC) sending unit 90, a transport block cyclic redundancy check (TB-CRC) adding unit 91, a block splitting unit 92, a code block CRC (CB-CRC) adding unit 93, an error correction coding unit 94, a rate matching unit 95, a block coupling unit 96, a modulating unit 97, a radio transmitting unit 98, and an antenna 99.

In accordance with data packets received from a higher-level device (not illustrated) or retransmission information received from the receiving apparatus 20, which will be described later, the MAC sending unit 90 creates a transport block or a control signal that is transmitted to the receiving apparatus 20. Examples of the control signal include HARQ retransmission information that indicates whether the transmission signal is retransmitted, a HARQ process number, a redundancy version of a HARQ, and the like.

The TB-CRC adding unit 91 adds an error detection code to the transport block that is created by the MAC sending unit 90. For example, the TB-CRC adding unit 91 adds an error detection code by using a cyclic redundancy check (CRC).

If the size of the transport block created by the MAC sending unit 90 is greater than a predetermined size, the block splitting unit 92 splits the transport block to which the error detection code is added by the TB-CRC adding unit 91 into the size of a code block.

The CB-CRC adding unit 93 adds an error detection code to the code block that is split by the block splitting unit 92. The error correction coding unit 94 adds a redundancy code used for the error correction to the code block that is split by the block splitting unit 92 to perform the encoding. The error correction coding unit 94 adds, for example, a turbo code as the redundancy code.

The rate matching unit 95 adjusts the size of the code block in accordance with the resources in the physical layer of the radio communication. For example, the rate matching unit 95 thins out redundancy codes, such as turbo codes, that are added to the code block. If a transport block is split by the block splitting unit 92, the block coupling unit 96 couples code blocks whose size is adjusted by the rate matching unit 95.

In the following, processes performed by the block splitting unit 92, the CB-CRC adding unit 93, the error correction coding unit 94, the rate matching unit 95, and the block coupling unit 96 will be described using examples. For example, it is assumed that the transport block TB1 is split into 10 code blocks CB#0 to #9 by the block splitting unit 92. In such a case, the CB-CRC adding unit 93 adds an error detection code to each of the code blocks CB#0 to #9. Furthermore, the error correction coding unit 94 adds a redundancy code to each of the code blocks CB#0 to #9. Furthermore, the rate matching unit 95 adjusts the size of the code blocks CB#0 to #9 to which both the error detection code and the redundancy code is added. Then, the block coupling unit 96 couples the code blocks CB#0 to #9 whose size is adjusted by the rate matching unit 95.

The modulating unit 97 converts the data stream that is coupled by the block coupling unit 96 to a modulated wave and multiplexes multiple channels or pilot signals. In the downlink of LTE, for example, quadrature phase shift keying (QPSK) or quadrature amplitude modulation (QAM) is used as a modulation system, whereas, for example, orthogonal frequency division multiplex (OFDM) is used as a multiplex system. The radio transmitting unit 98 converts the modulated wave to a radio frequency to perform amplification, filtering, or the like. Then, the radio transmitting unit 98 transmits the radio signal to the outside via the antenna 99.

As illustrated in FIG. 2, the receiving apparatus 20 according to the second embodiment includes an antenna 21, a radio receiving unit 22, a demodulating unit 23, a block splitting unit 24, a rate dematching unit 25, a HARQ combining unit 110, a HARQ buffer 120, an error correction decoder 130, a CB-CRC checking unit 140, a block coupling unit 150, a TB-CRC checking unit 160, and a MAC receiving unit 26.

The radio receiving unit 22 amplifies the signal that is received via the antenna 21, performs filtering on the received signal, and converts the frequency band of the received signal from the radio frequency to the baseband. The demodulating unit 23 separates the multiplexed channel and creates, from the separated modulated wave, a signal indicating the likelihood of the data stream (hereinafter, referred to as a "likelihood signal").

If the size of the received signal is greater than a predetermined size, the block splitting unit 24 splits the likelihood signal that is created by the demodulating unit 23 into the size of a code block. For example, it is assumed that the transport block TB10 is split into 10 code blocks CB#0 to #9 by the block splitting unit 92 in the transmitter 9, as described in the example above. In such a case, the block splitting unit 24 in the receiving apparatus 20 splits the likelihood signal that is output from the demodulating unit 23 into 10 likelihood signals. The block splitting unit 24 corresponds to the splitting unit 11 illustrated in FIG. 1.

The rate dematching unit 25 adjusts the size of the likelihood signal that is split by the block splitting unit 24. Then, the rate dematching unit 25 outputs the likelihood signal that is split by the block splitting unit 24 to the HARQ combining unit 110.

If the likelihood signal received from the rate dematching unit 25 is created from a retransmission signal, the HARQ combining unit 110 acquires the likelihood signal from the HARQ buffer 120. Then, the HARQ combining unit 110 performs maximum ratio combining to combine the likelihood signal acquired from the HARQ buffer 120 and the likelihood signal received from the rate dematching unit 25. In contrast, if the likelihood signal received from the rate dematching unit 25 is not a retransmission signal, the HARQ combining unit 110 does not perform any process. The HARQ combining unit 110 corresponds to the combining unit 16 illustrated in FIG. 1.

The HARQ buffer 120 stores therein likelihood signals for each code block size. The likelihood signals stored in the HARQ buffer 120 will be described with reference to FIG. 3 in detail later. The HARQ buffer 120 corresponds to the split signal storing unit 13 illustrated in FIG. 1.

The error correction decoder 130 acquires, from the HARQ buffer 120, the likelihood signal corresponding to the size of the code block; performs error correction by using the redundancy code that is added to the acquired likelihood signal; decodes the likelihood signal that has been subjected to the error correction; and creates a code block that has not been encoded.

The CB-CRC checking unit 140 performs error checking on the code block created by the error correction decoder 130. The CB-CRC checking unit 140 corresponds to the split signal checking unit 14 illustrated in FIG. 1.

If the received signal is split by the block splitting unit 24, the block coupling unit 150 creates a transport block by coupling the code blocks output from the CB-CRC checking unit 140. The TB-CRC checking unit 160 performs error checking on the transport block created by the block coupling unit 150.

If an error is not detected in the transport block by the TB-CRC checking unit 160, the MAC receiving unit 26 outputs a data packet and transmits an acknowledgment (ACK) to the transmitter 9 as retransmission information. In contrast, if an error is detected in the transport block by the TB-CRC checking unit 160, the MAC receiving unit 26 transmits a negative acknowledgment (NACK) to the transmitter 9 as retransmission information. The receiving apparatus 20 transmits the retransmission information to the transmitter 9 using a control channel in the uplink.

Each unit included in the HARQ combining unit 110 or in the error correction decoder 130 uses code block numbers that identify the code blocks to specify the likelihood signal that is split into the size of a code block or the code block that is created by the error correction decoder 130. Such code block numbers are used for specifying a split signal when a signal transmitted in the same HARQ process is split. In the second embodiment, it is assumed that the same code block number may be used for signals that are transmitted in the different HARQ processes. Furthermore, in the second embodiment, it is assumed that code block numbers #0, #1, #2, . . . , are sequentially added to the split signals from the top. For example, if a likelihood signal of a received signal A is split into 10 likelihood signals A0, A1, . . . , and A9, the code block numbers of the likelihood signals A0 to A9 are "#0" to "#9", respectively. Furthermore, for example, if a likelihood signal of a received signal B is split into 10 likelihood signals B0, B1, . . . , and B9, the code block numbers of the likelihood signals B0 to B9 are "#0" to "#9", respectively.

Furthermore, the radio receiving unit 22 described above is an integrated circuit, such as an application specific integrated circuit (ASIC) or a field programmable gate array (FPGA), or is an electronic circuit, such as a central processing unit (CPU). Similarly, the demodulating unit 23, the block splitting unit 24, the rate dematching unit 25, the HARQ combining unit 110, the error correction decoder 130, the CB-CRC checking unit 140, the block coupling unit 150, the TB-CRC checking unit 160, and the MAC receiving unit 26 are, for example, an integrated circuit or an electronic circuit. The HARQ buffer 120 is a semiconductor memory device, such as a random access memory (RAM), a read only memory (ROM), and a flash memory, or a storage device, such as a hard disk and an optical disk.

Figure 3:
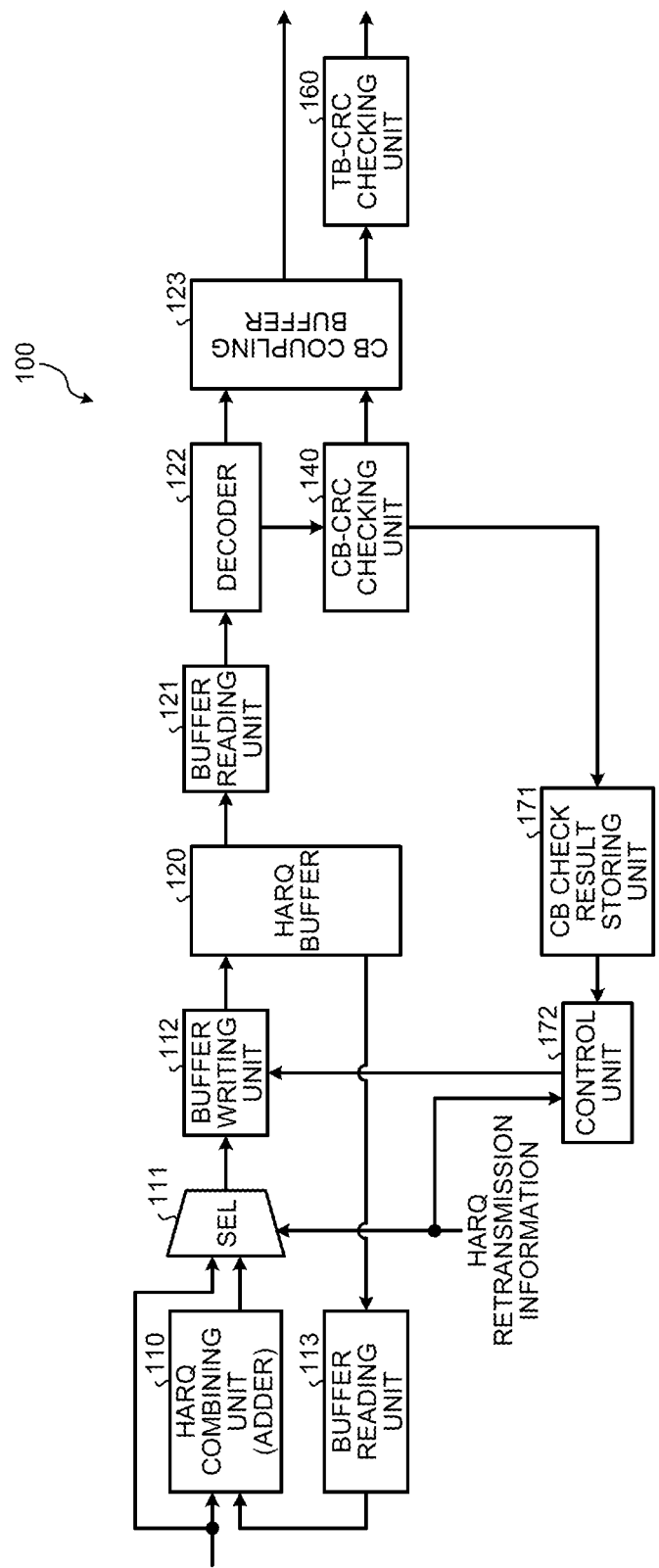
FIG. 3 is a schematic diagram illustrating an example configuration of a HARQ combining/coupling unit illustrated in FIG. 2.

In the following, the configuration of an HARQ combining/coupling unit 100 illustrated in FIG. 2 will be described in detail with reference to FIG. 3. FIG. 3 is a schematic diagram illustrating an example configuration of the HARQ combining/coupling unit 100 illustrated in FIG. 2. As illustrated in FIG. 3, the HARQ combining/coupling unit 100 includes the HARQ combining unit 110, a selection circuit (SEL) 111, a buffer writing unit 112, a buffer reading unit 113, the HARQ buffer 120, a buffer reading unit 121, a decoder 122, a CB coupling buffer 123, the CB-CRC checking unit 140, the TB-CRC checking unit 160, a CB check result storing unit 171, and a control unit 172.

First, a process performed by each of the units illustrated in FIG. 3 will be described by using an example case in which a signal received by the receiving apparatus 20 is not a retransmission signal but is a signal that is received for the first time. In the description below, a signal that is received for the first time is sometimes referred to as a "first signal". In the example illustrated in FIG. 3, if a received signal is a first signal, the HARQ combining unit 110 and the buffer reading unit 113 do not perform any process.

The SEL 111 receives the likelihood signal subjected to the maximum ratio combining from the HARQ combining unit 110 and also receives, from the rate dematching unit 25, the likelihood signal created from the first signal. The size of the likelihood signal received by the SEL 111 from the HARQ combining unit 110 or from the rate dematching unit 25 corresponds to the size of the code block. Then, the SEL 111 outputs, to the buffer writing unit 112, either one of the likelihood signal received from the HARQ combining unit 110 or the likelihood signal received from the rate dematching unit 25.

Specifically, if the HARQ retransmission information transmitted via the control channel indicates a first signal, the SEL 111 outputs, to the buffer writing unit 112, the likelihood signal received from the rate dematching unit 25. In contrast, if the HARQ retransmission information indicates a retransmission signal, the SEL 111 outputs, to the buffer writing unit 112, the likelihood signal received from the HARQ combining unit 110. In this case, because the received signal is assumed to be the first signal, the SEL 111 outputs, to the buffer writing unit 112, the likelihood signal received from the rate dematching unit 25.

The buffer writing unit 112 is controlled by the control unit 172, which will be described later, and overwrites, in the HARQ buffer 120, the likelihood signal received from the SEL 111. If a received signal is a first signal, the control unit 172, which will be described later, controls the buffer writing unit 112 such that the buffer writing unit 112 performs a writing process. Accordingly, in this case, because the received signal is assumed to be the first signal, the buffer writing unit 112 writes, in the HARQ buffer 120, the likelihood signal received from the SEL 111. The buffer writing unit 112 corresponds to the split signal retaining unit 12 illustrated in FIG. 1.

The HARQ buffer 120 stores therein, for each HARQ process, the likelihood signal that is split in code block units. In the second embodiment, because a maximum of eight HARQ processes are assumed to be performed, the HARQ buffer 120 has a storage area for retaining the likelihood signal at intervals of, at least, eight HARQ processes.

The buffer reading unit 121 reads the likelihood signal stored in the HARQ buffer 120 and outputs the read likelihood signal to the decoder 122. The decoder 122 performs error correction by using the redundancy code that is added to the likelihood signal received from the buffer reading unit 121 and creates a code block by decoding the likelihood signal that has been subjected to the error correction. Then, the decoder 122 retains the created code block in the CB coupling buffer 123 and outputs the created code block to the CB-CRC checking unit 140. The decoder 122 corresponds to the error correction decoder 130 illustrated in FIG. 2.

Figures 4, 5:
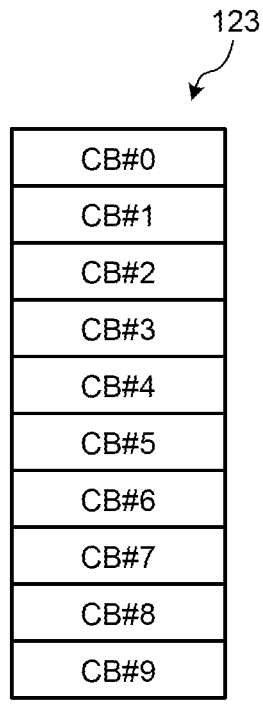
FIG. 4 is a schematic diagram illustrating an example of a CB coupling buffer according to the second embodiment.
FIG. 5 is a schematic diagram illustrating an example of a CB check result storing unit.

FIG. 4 illustrates an example of the CB coupling buffer 123 according to the second embodiment. In this case, because it is assumed that the transport block is split into a maximum of 10 transport blocks, the CB coupling buffer 123 illustrated in FIG. 4 stores therein a maximum of 10 code blocks. It is then assumed, for example, that the likelihood signal that is output from the demodulating unit 23 by the block splitting unit 24 is split into 10 likelihood signals and that the decoder 122 decodes the subject 10 likelihood signals and creates the code blocks CB#0 to #9. In such a case, as illustrated in FIG. 4, the decoder 122 stores the created code blocks CB#0 to #9 in the CB coupling buffer 123.

The CB-CRC checking unit 140 performs error checking on the code block received from the decoder 122. Then, the CB-CRC checking unit 140 stores the results of the error checking in the CB check result storing unit 171. The TB-CRC checking unit 160 reads all of the code blocks stored in the CB coupling buffer 123 and performs the error checking on all of the read transport blocks.

The decoder 122 described above controls the code block detected by the CB-CRC checking unit 140 such that the code block is not written in the CB coupling buffer 123. Furthermore, the TB-CRC checking unit 160 described above does not perform the error checking on the transport block that contains a code block in which an error is detected by the CB-CRC checking unit 140.

The CB check result storing unit 171 stores therein the results of the error checking performed by the CB-CRC checking unit 140. FIG. 5 illustrates an example of the CB check result storing unit 171. FIG. 5 illustrates an example of the CB check result storing unit 171. In the example illustrated in FIG. 5, the CB check result storing unit 171 stores therein, for each HARQ process number that identifies a HARQ process, error checking results by associating them with the code block numbers. In the example illustrated in FIG. 5, if "0" is stored in the CB check result storing unit 171, this indicates that an error is detected in a code block, whereas if "1" is stored, this indicates that an error is not detected in a code block.

For example, the CB check result storing unit 171 illustrated in FIG. 5 indicates that an error is not detected in a code block that has the HARQ process number of "#0" and has the code block number of "#0". Furthermore, the CB check result storing unit 171 illustrated in FIG. 5 indicates that an error is detected in a code block that has the HARQ process number of "#0" and has the code block number of "#1".

The control unit 172 controls the buffer writing unit 112. Specifically, if the first signal is received, the control unit 172 controls the buffer writing unit 112 such that the buffer writing unit 112 performs the writing process. For example, if the first signal is received, the control unit 172 sends, to the buffer writing unit 112, an "enable signal" that is a request to perform the writing process. Furthermore, in accordance with the HARQ retransmission information transmitted via the control channel, the control unit 172 determines whether the received signal is a first signal or a retransmission signal. A process performed by the control unit 172 when the received signal is a retransmission signal will be described later.

As described above, if the receiving apparatus 20 receives the first signal, the HARQ combining/coupling unit 100 retains likelihood signals that are obtained by splitting the first signal in the HARQ buffer 120 and performs, for each split likelihood signal, error correction, decoding, error checking, or the like. Then, the HARQ combining/coupling unit 100 couples the decoded code blocks and performs the error checking on a coupled transport block.

Subsequently, a process performed by each unit illustrated in FIG. 3 will be described by using an example case in which the signal received by the receiving apparatus 20 is a retransmission signal. Descriptions of components that perform the same process as that performed when the signal received by the receiving apparatus 20 is the first signal will be omitted. Specifically, processes performed by the HARQ buffer 120, the buffer reading unit 121, the decoder 122, the CB coupling buffer 123, the CB-CRC checking unit 140, the TB-CRC checking unit 160, and the CB check result storing unit 171 will be omitted.

If the received signal is a retransmission signal, the HARQ combining unit 110 receives, from the rate dematching unit 25, a likelihood signal that is created from the subject retransmission signal. In such a case, the buffer reading unit 113 reads, from the HARQ buffer 120, a likelihood signal that matches the HARQ process number of the retransmission source signal associated with the subject retransmission signal and that matches the code block number of the likelihood signal that is input to the HARQ combining unit 110. Then, the HARQ combining unit 110 uses maximum ratio combining to combine the likelihood signal that is received from the rate dematching unit 25 and the likelihood signal that is read by the buffer reading unit 113 and outputs, to the SEL 111, the likelihood signal that has been subjected to the maximum ratio combining.

If the received signal is a retransmission signal, the SEL 111 receives, from the HARQ combining unit 110, the likelihood signal that has been subjected to the maximum ratio combining and outputs the received likelihood signal to the buffer writing unit 112.

If the received signal is a retransmission signal, the control unit 172 acquires, from the CB check result storing unit 171, an error checking result that matches the HARQ process number of the retransmission source signal associated with the subject received signal and that matches the code block number of the likelihood signal input to the HARQ combining unit 110. Then, if the acquired error checking result is "1 (no error)", the control unit 172 controls the buffer writing unit 112 such that the buffer writing unit 112 does not perform the writing process. For example, the control unit 172 sends, to the buffer writing unit 112, a "disable signal" that is a request not to perform the writing process.

In contrast, if the error checking result acquired from the CB check result storing unit 171 is "0 (error)", the control unit 172 controls the buffer writing unit 112 such that the buffer writing unit 112 performs the writing process. For example, the control unit 172 sends, to the buffer writing unit 112, an "enable signal" that is a request to perform the writing process.

If the buffer writing unit 112 receives, from the control unit 172, the disable signal, the buffer writing unit 112 does not write, in the HARQ buffer 120, the likelihood signal received from the SEL 111. In contrast, if the buffer writing unit 112 receives, from the control unit 172, the enable signal, the buffer writing unit 112 writes, in the HARQ buffer 120, the likelihood signal received from the SEL 111.

As described above, if the received signal is a retransmission signal, the control unit 172 performs a control such that, from among the likelihood signals stored in the HARQ buffer 120, a likelihood signal in which an error is not detected is not updated. Furthermore, the control unit 172 performs a control such that, from among the likelihood signals stored in the HARQ buffer 120, a likelihood signal in which an error is detected is updated to a likelihood signal that has been subjected to the maximum ratio combining performed by the HARQ combining unit 110.

In the following, a process performed by the control unit 172 will be described using examples. In the example, it is assumed that the receiving apparatus 20 receives a first signal C. Then, it is assumed that the block splitting unit 24 splits the first signal C into 10 likelihood signals C0, C1, . . . , and C9. Specifically, the HARQ buffer 120 stores therein the likelihood signals C0, C1, . . . , and C9. Then, it is assumed that the decoder 122 decodes the likelihood signals C0, C1, . . . , and C9 and creates the code blocks CB0, CB1, . . . , and CB9. The CB-CRC checking unit 140 performs the error checking on the code blocks CB0, CB1, . . . , and CB9. In this case, it is assumed that the CB-CRC checking unit 140 detects an error in each of the code blocks CB0 and CB8 and does not detect an error in each of the code blocks CB1 to CB7, and CB9. Thereafter, it is assumed that the receiving apparatus 20 receives a retransmission signal D of the first signal C. In this case, it is assumed that the block splitting unit 24 splits the retransmission signal D into 10 likelihood signals D0, D1, . . . , and D9. The HARQ combining unit 110 uses maximum ratio combining to combine a likelihood signal C0 and a likelihood signal D0 and uses maximum ratio combining to combine the likelihood signal C1 and the likelihood signal D1. Similarly, the HARQ combining unit 110 uses maximum ratio combining to combine the likelihood signals C2 to C9 and the likelihood signals D2 to D9, respectively.

In such a case, the control unit 172 performs a control such that, from among the likelihood signals C0 to C9 stored in the HARQ buffer 120, the likelihood signals C1 to C7 and C9 in each of which an error has not been detected are not updated to the likelihood signals subjected to the maximum ratio combining by the HARQ combining unit 110. The reason for this is that an error is not detected in each of the likelihood signals C1 to C7 and C9 stored in the HARQ buffer 120; therefore, it is preferable that each of the likelihood signals C1 to C7 and C9 be not updated to a likelihood signal that is created by performing the maximum ratio combining on the retransmission signal. Specifically, if an error is contained in each of the likelihood signals D1 to D7 and D9 in the retransmission signal D, the likelihood signals C1 to C7 and C9 that do not contain an error may possibly be updated to the likelihood signals containing an error.

In contrast, the control unit 172 performs a control such that, from among the likelihood signals C0 to C9 stored in the HARQ buffer 120, the likelihood signals C0 and C8 in each of which an error is detected are updated to likelihood signals that have been subjected to the maximum ratio combining by the HARQ combining unit 110. Specifically, the control unit 172 performs a control such that the likelihood signal C0 stored in the HARQ buffer 120 is updated to the likelihood signal that is created by performing the maximum ratio combining on the likelihood signal C0 and the likelihood signal D0. Furthermore, the control unit 172 performs a control such that the likelihood signal C8 stored in the HARQ buffer 120 is updated to the likelihood signal that is created by performing the maximum ratio combining on the likelihood signal C8 and the likelihood signal D8.

Furthermore, in addition to controlling the buffer writing unit 112, the control unit 172 may also control the HARQ combining unit 110, the SEL 111, the buffer writing unit 112, and the buffer reading unit 113. Specifically, if the likelihood signal D0 or D8 is input to the HARQ combining unit 110, the control unit 172 controls the HARQ combining unit 110, the SEL 111, the buffer writing unit 112, and the buffer reading unit 113 such that they perform processing. In contrast, if the likelihood signals D1 to D7 and D9 are input to the HARQ combining unit 110, the control unit 172 controls the HARQ combining unit 110, the SEL 111, the buffer writing unit 112, and the buffer reading unit 113 such that they do not perform processing. More specifically, if the likelihood signals D1 to D7 and D9 are input to the HARQ combining unit 110, the control unit 172 prevents the HARQ combining unit 110 from performing the combining process and prevents the buffer reading unit 113 likelihood signal from performing the reading process. Accordingly, the control unit 172 can reduce the processing load on the HARQ combining unit 110, the buffer reading unit 113, or the like. Furthermore, the control unit 172 can reduce the electrical power consumption of the HARQ combining unit 110, the buffer reading unit 113, or the like.

Figure 6:
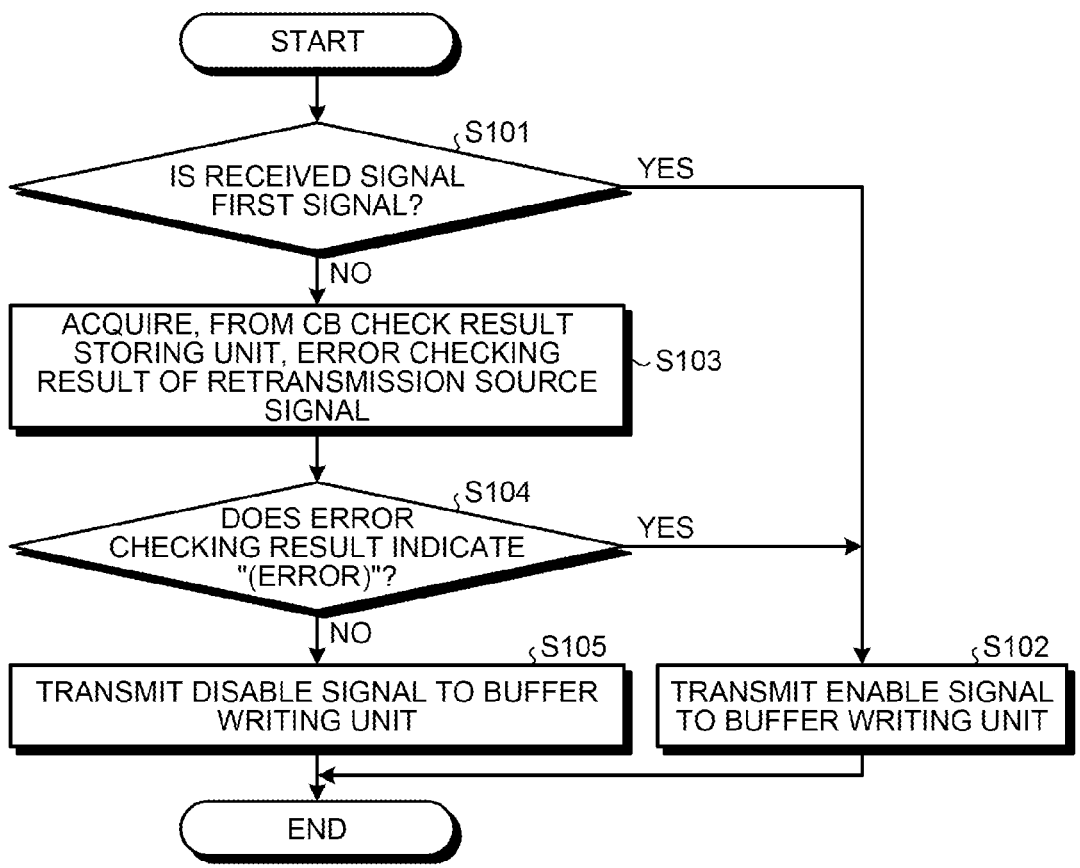
FIG. 6 is a flowchart illustrating the flow of a process performed by a control unit according to the second embodiment.

Flow of the Process Performed by the Control Unit According to the Second Embodiment In the following, the flow of the process performed by the control unit 172 according to the second embodiment will be described with reference to FIG. 6. FIG. 6 is a flowchart illustrating the flow of a process performed by the control unit 172 according to the second embodiment. As illustrated in FIG. 6, if a signal received by the receiving apparatus 20 is a first signal (Yes at Step S101), the control unit 172 transmits the enable signal to the buffer writing unit 112 (Step S102). By doing so, the buffer writing unit 112 writes, in the HARQ buffer 120, the likelihood signal that is received from the SEL 111.

In contrast, if the signal received from the receiving apparatus 20 is not a first signal but is a retransmission signal (No at Step S101), the control unit 172 acquires an error checking result from the CB check result storing unit 171 (Step S103). Specifically, the control unit 172 acquires, from the CB check result storing unit 171, an error checking result that matches the HARQ process number of the retransmission source signal and that matches the code block number of the likelihood signal that is input to the HARQ combining unit 110.

Then, if the error checking result acquired at Step S103 is "1 (no error)" (No at Step S104), the control unit 172 transmits the disable signal to the buffer writing unit 112 (Step S105). Accordingly, the buffer writing unit 112 does not write, in the HARQ buffer 120, the likelihood signal received from the SEL 111.

In contrast, if the error checking result acquired at Step S103 is "0 (error)" (Yes at Step S104), the control unit 172 transmits the enable signal to the buffer writing unit 112 (Step S102). Accordingly, the buffer writing unit 112 writes, in the HARQ buffer 120, the likelihood signal received from the SEL 111.

Advantage of the Second Embodiment

As described above, even if the receiving apparatus 20 according to the second embodiment receives a retransmission signal, the receiving apparatus 20 does not update a likelihood signal in which an error is not detected from among the likelihood signals stored in the HARQ buffer 120. In contrast, if the receiving apparatus 20 according to the second embodiment receives a retransmission signal, the receiving apparatus 20 updates, from among the likelihood signals stored in the HARQ buffer 120, the likelihood signal in which an error is detected to a likelihood signal subjected to maximum ratio combining performed by the HARQ combining unit 110.

Accordingly, even if the receiving apparatus 20 according to the second embodiment receives a retransmission signal that contains an error, the receiving apparatus 20 does not use a signal subjected to the maximum ratio combining performed on a retransmission signal, in which an error is contained, and a likelihood signal, stored in the HARQ buffer 120 and in which an error is not detected. Accordingly, the receiving apparatus 20 according to the second embodiment does not detect an error from a signal that is created from a maximum ratio combining performed on a the retransmission signal, in which an error is contained, and a likelihood signal, stored in the HARQ buffer 120 and in which an error is not detected. Accordingly, because the number of requests the receiving apparatus 20 according to the second embodiment sends to the transmitter 9 to retransmits the signal decreases, the throughput of the mobile communication system improves.

[c] Third Embodiment

In the second embodiment, a case is described as an example in which, if the retransmission signal is received, the receiving apparatus 20 controls, in accordance with the error checking result of the retransmission source signal, whether the likelihood signal stored in the HARQ buffer 120 is updated. However, the receiving apparatus disclosed in the present invention may also control, when a retransmission signal is received, in accordance with the error checking result of the retransmission source signal, whether the code block stored in the CB coupling buffer is updated. In a third embodiment, a description will be given of a case in which the code block stored in the CB coupling buffer is updated.

Configuration of a Receiving Apparatus According to the Third Embodiment

First, the configuration of a receiving apparatus according to the third embodiment will be described. The configuration of the mobile communication system that uses the receiving apparatus according to the third embodiment is the same as that performed by the mobile communication system illustrated in FIG. 2. However, when compared with the receiving apparatus 20 illustrated in FIG. 2, the configuration of the HARQ combining/coupling unit 100 included in the receiving apparatus 20 differs from a HARQ combining/coupling unit included in the receiving apparatus according to the third embodiment.

Figure 7:
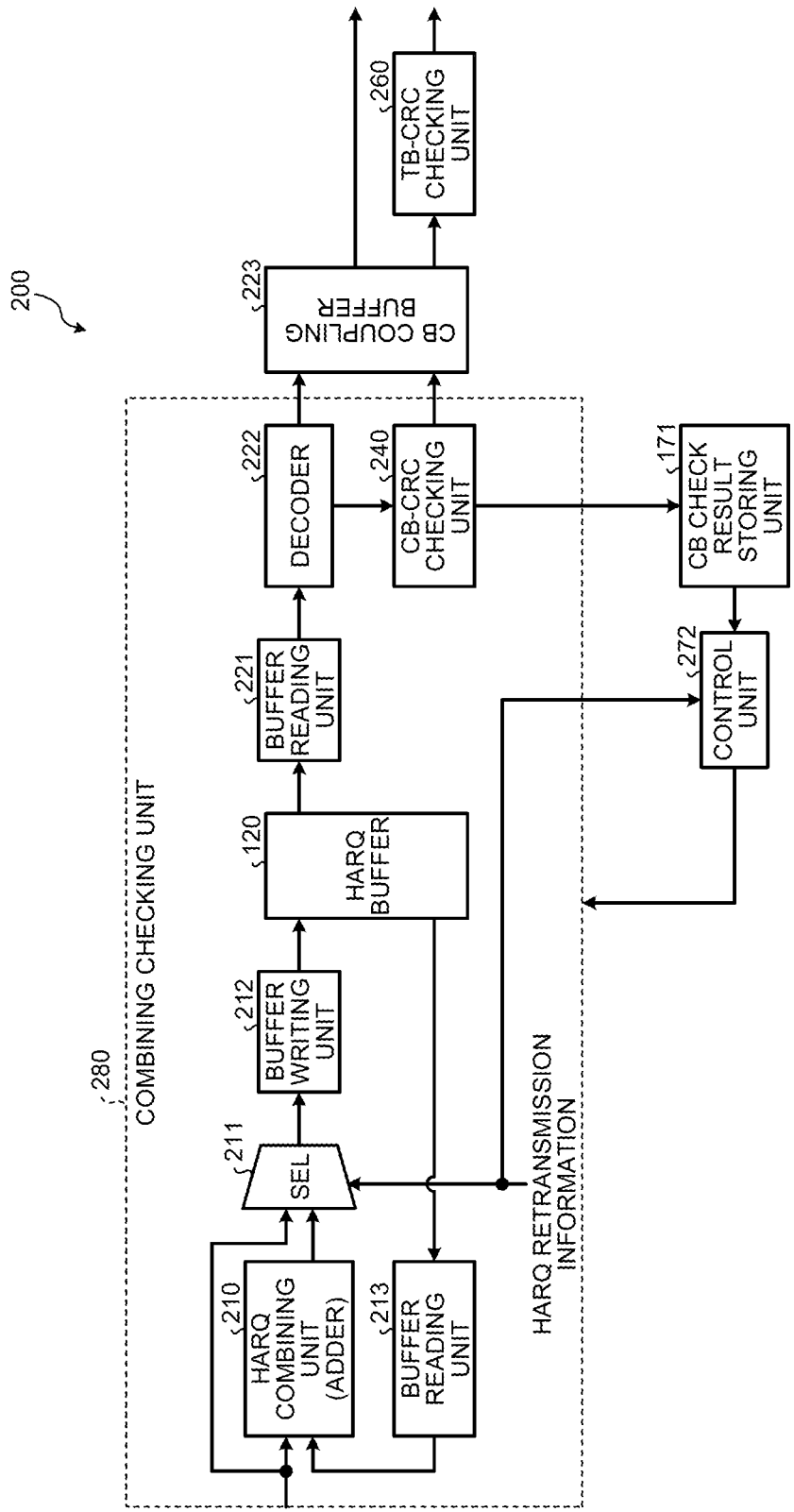
FIG. 7 is a schematic diagram illustrating an example configuration of a HARQ combining/coupling unit according to a third embodiment.

FIG. 7 is a schematic diagram illustrating an example configuration of a HARQ combining/coupling unit 200 according to a third embodiment. In the following, components having the same function as those described above are assigned the same reference numerals; therefore, a description thereof is omitted. As illustrated in FIG. 7, the HARQ combining/coupling unit 200 includes the CB check result storing unit 171, a CB coupling buffer 223, a TB-CRC checking unit 260, a control unit 272, and a combining checking unit 280.

The CB coupling buffer 223 stores therein, for each HARQ process, code blocks that are decoded by a decoder 222, which will be described later. FIG. 8 illustrates an example of the CB coupling buffer 223 according to the third embodiment. The CB coupling buffer 223 illustrated in FIG. 8 stores therein the code blocks by associating them with the HARQ process numbers. In this case, because it is assumed that a maximum of eight HARQ processes are performed, the CB coupling buffer 223 stores therein the code block by associating them with the HARQ process numbers #0 to #7. Furthermore, in this case, because it is assumed that a transport block is split into a maximum of 10 blocks, the CB coupling buffer 223 illustrated in FIG. 8 stores therein, for each HARQ process, a maximum of 10 code blocks.

The TB-CRC checking unit 260 reads, for each HARQ process number from the CB coupling buffer 223, a code block and performs error checking on the read transport block. For example, it is assumed that the information stored in the CB coupling buffer 223 is like that illustrated in FIG. 8. In such a case, the TB-CRC checking unit 260 reads, for example, the code blocks #0 to #9 stored in the HARQ process number "#0" and performs the error checking on a transport block obtained by coupling the code blocks #0 to #9. Similarly, the TB-CRC checking unit 260 also performs error checking on the code blocks #0 to #9 stored in the HARQ process numbers "#1" to "#9". Furthermore, the TB-CRC checking unit 260 may also delete, from the CB coupling buffer 223, the code blocks #0 to #9 obtained from a transport block in which an error is not detected.

The control unit 272 controls the combining checking unit 280. Specifically, if the receiving apparatus receives a first signal, the control unit 272 controls the combining checking unit 280 such that the combining checking unit 280 performs processing. For example, if the receiving apparatus receives a first signal, the control unit 272 transmits, to the combining checking unit 280, the "enable signal" that is a request to perform a process.

Furthermore, if the receiving apparatus receives a retransmission signal, the control unit 272 acquires, from the CB check result storing unit 171, an error checking result that matches the HARQ process number of the retransmission source signal and that matches the code block number of the likelihood signal that is input to a HARQ combining unit 210.

Then, if the acquired error checking result is "1 (no error)", the control unit 272 controls the combining checking unit 280 such that the combining checking unit 280 does not perform processing. For example, the control unit 272 sends, to the combining checking unit 280, a "disable signal" that is a request not to perform processing. In contrast, if the error checking result acquired from the CB check result storing unit 171 is "0 (error)", the control unit 272 controls the combining checking unit 280 such that the combining checking unit 280 performs processing. For example, the control unit 272 sends, to the combining checking unit 280, an "enable signal" that is a request to perform processing.

The combining checking unit 280 performs maximum ratio combining, error checking, or the like on the likelihood signal that is controlled by the control unit 272 and is input from the rate dematching unit 25. As illustrated in FIG. 7, the combining checking unit 280 includes the HARQ buffer 120, the HARQ combining unit 210, a SEL 211, a buffer writing unit 212, a buffer reading unit 213, a buffer reading unit 221, the decoder 222, and a CB-CRC checking unit 240.

If a disable signal is received from the control unit 272, each unit, such as the HARQ combining unit 210, included in the HARQ combining unit 210 does not perform processing, whereas if an enable signal is received from the control unit 272, each unit performs processing. In the following, each of the units included in the HARQ combining unit 210 will be described.

Even if an enable signal is received from the control unit 272, if the received signal is the first signal, the HARQ combining unit 210 and the buffer reading unit 213 do not perform processing. In contrast, if the received signal is the retransmission signal and if an enable signal is received from the control unit 272, the buffer reading unit 213 reads, from the HARQ buffer 120, a likelihood signal that matches the HARQ process number of the retransmission source signal and that matches the code block number of the likelihood signal that is input to the HARQ combining unit 210.

If the received signal is a retransmission signal and if the enable signal is received from the control unit 272, the HARQ combining unit 210 performs maximum ratio combining to combine the likelihood signal that is received from the rate dematching unit 25 and the likelihood signal that is read by the buffer reading unit 213.

If the HARQ retransmission information indicates a first signal, the SEL 211 outputs the likelihood signal received from the rate dematching unit 25 to the buffer writing unit 212. In contrast, if the HARQ retransmission information indicates the retransmission signal and if the enable signal is received from the control unit 272, the SEL 211 outputs the likelihood signal received from the HARQ combining unit 210 to the buffer writing unit 212.

If the buffer writing unit 212 receives the enable signal from the control unit 272, the buffer writing unit 212 writes, in the HARQ buffer 120, the likelihood signal received from the SEL 211. If the buffer reading unit 221 receives the enable signal from the control unit 272, the buffer reading unit 221 reads the likelihood signal stored in the HARQ buffer 120 and outputs the read likelihood signal to the decoder 222.

If the enable signal is received from the control unit 272, the decoder 222 performs error correction on the likelihood signal received from the buffer reading unit 221 and decodes the likelihood signal that has been subjected to the error correction. Then, the decoder 222 retains the decoded code block in the CB coupling buffer 223. At this time, the decoder 222 retains the code block in the region, in the CB coupling buffer 223, associated with the HARQ process number of the decoded likelihood signal.

If the enable signal is received from the control unit 272, the CB-CRC checking unit 240 performs the error checking on the code block received from the decoder 222 and retains, in the CB check result storing unit 171, the result of the error checking.

As described above, if the HARQ combining/coupling unit 200 receives the retransmission signal, the HARQ combining/coupling unit 200 does not update the code block in which an error is not detected from among the code blocks stored in the CB coupling buffer 223. Furthermore, the HARQ combining/coupling unit 200 updates the code block, from among code blocks stored in the CB coupling buffer 223, in which an error is detected to a code block that is decoded by the decoder 222.

For example, it is assumed that the receiving apparatus receives a first signal E. Furthermore, it is assumed that the block splitting unit 24 splits the first signal E into 10 likelihood signals E0, E1, . . . , and E9. Furthermore, it is assumed that the decoder 222 decodes the likelihood signals E0, E1, . . . , and E9 and stores code blocks CBE0, CBE1, . . . , and CBE9 in the CB coupling buffer 223. Furthermore, the CB-CRC checking unit 240 performs error checking on the code blocks CBE0, CBE1, . . . , and CBE9. In this case, it is assumed that the CB-CRC checking unit 240 detects an error in each of the code blocks CBE0 and CBE1 and does not detect an error in each of the code blocks CBE2 to CBE9. Thereafter, it is assumed that the receiving apparatus receives a retransmission signal F of the first signal E. In such a case, it is assumed that the block splitting unit 24 splits the retransmission signal F into 10 likelihood signals F0 to F9.

In such a case, from among the code blocks CBE0 to CBE9 stored in the CB coupling buffer 223, the control unit 272 controls the code blocks CBE2 to CBE9 in each of which an error is not detected such that the code blocks CBE2 to CBE9 are not updated. Specifically, if the likelihood signals F2 to F9 are input to the combining checking unit 280 from the rate dematching unit 25, the control unit 272 controls the combining checking unit 280 such that the combining checking unit 280 does not perform processing. The reason for this is that an error is not detected in each of the code blocks CBE2 to CBE9 stored in the CB coupling buffer 223, it is preferable that each of the code blocks CBE2 to CBE9 be not updated to a code block created from a likelihood signal subjected to the maximum ratio combining that is performed on the retransmission signal and the subject likelihood signal.

In contrast, the control unit 272 controls, from among the code blocks CBE0 to CBE9 stored in the CB coupling buffer 223, the code blocks CBE0 and CBE1, in each of which an error is detected, such that the code blocks CBE0 and CBE1 are updated. Specifically, if the likelihood signals F0 and F1 are input to the combining checking unit 280 from the rate dematching unit 25, the control unit 272 controls the combining checking unit 280 such that the combining checking unit 280 performs processing.

Figure 9:
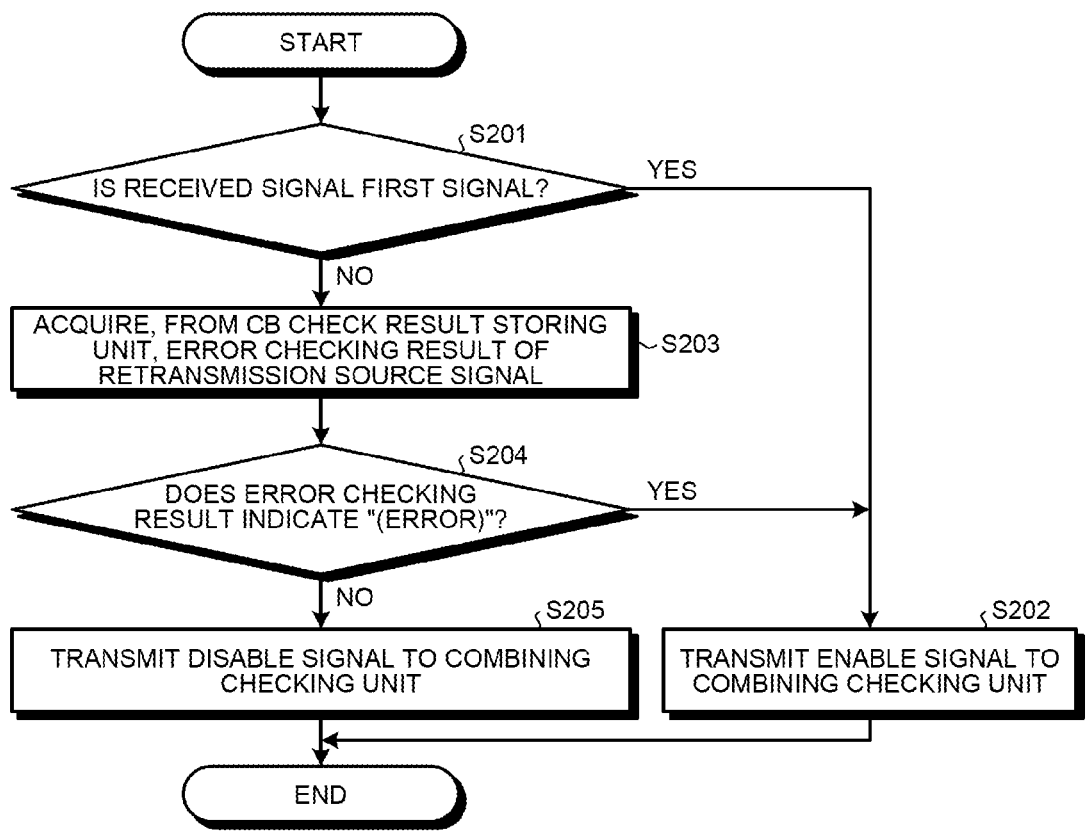
FIG. 9 is a flowchart illustrating the flow of a process performed by a control unit according to the third embodiment.

Flow of a Process Performed by the Control Unit According to the Third Embodiment In the following, the flow of a process performed by the control unit 272 according to the third embodiment will be described with reference to FIG. 9. FIG. 9 is a flowchart illustrating the flow of a process performed by the control unit 272 according to the third embodiment. As illustrated in FIG.

9, if the signal received by the receiving apparatus is a first signal (Yes at Step S201), the control unit 272 transmits an enable signal to the combining checking unit 280 (Step S202).

In contrast, if a retransmission signal is received (No at Step S201), the control unit 272 acquires an error checking result from the CB check result storing unit 171 (Step S203). Specifically, the control unit 272 acquires, from the CB check result storing unit 171, an error checking result that matches the HARQ process number of the retransmission source signal and that matches the code block number of the likelihood signal that is input to the HARQ combining unit 210.

Then, if the error checking result acquired at Step S203 is "1 (no error)" (No at Step S204), the control unit 272 transmits the disable signal to the combining checking unit 280 (Step S205). In contrast, if the error checking result acquired at Step S203 is "0 (error)" (Yes at Step S204), the control unit 272 transmits the enable signal to the combining checking unit 280 (Step S202).

Advantage of the Third Embodiment

As described above, even if the receiving apparatus according to the third embodiment receives a retransmission signal, the receiving apparatus does not update a code block in which an error is not detected from among the code blocks stored in the CB coupling buffer 223. Furthermore, if the receiving apparatus according to the third embodiment receives a retransmission signal, the receiving apparatus updates, from among the code blocks stored in the CB coupling buffer 223, a code block in which an error is detected to the code block that is decoded by the decoder 222. Accordingly, the receiving apparatus according to the third embodiment can improve the throughput of the mobile communication system.

Furthermore, if the receiving apparatus according to the third embodiment receives a retransmission signal, when the receiving apparatus processes a likelihood signal in which an error is not detected at the time of receiving the retransmission signal, the receiving apparatus stops the process performed by the combining checking unit 280, thus reducing the electrical power consumption. Accordingly, the receiving apparatus according to the third embodiment can improve the throughput of the mobile communication system and reduce the electrical power consumption.

[d] Fourth Embodiment

In the third embodiment described above, as in the example illustrated in FIG. 8, the CB coupling buffer 223 retains a region that stores therein the number of code blocks corresponding to the maximum number of HARQ processes. However, the CB coupling buffer 223 may not retain the region that stores therein the code block by the maximum number of HARQ processes. In a fourth embodiment, an example case will be given in which the CB coupling buffer stores therein code blocks by associating them with the HARQ processes the number of which is less than the maximum number of HARQ processes.

Configuration of the Receiving Apparatus According to the Fourth Embodiment

First, the configuration of a receiving apparatus according to the fourth embodiment will be described. The configuration of the mobile communication system that uses the receiving apparatus according to the fourth embodiment is the same as that illustrated in FIG. 2. However, when compared with the receiving apparatus 20 illustrated in FIG. 2, the configuration of the HARQ combining/coupling unit 100 included in the receiving apparatus 20 differs from a HARQ combining/coupling unit included in the receiving apparatus according to the fourth embodiment.

Figure 10:
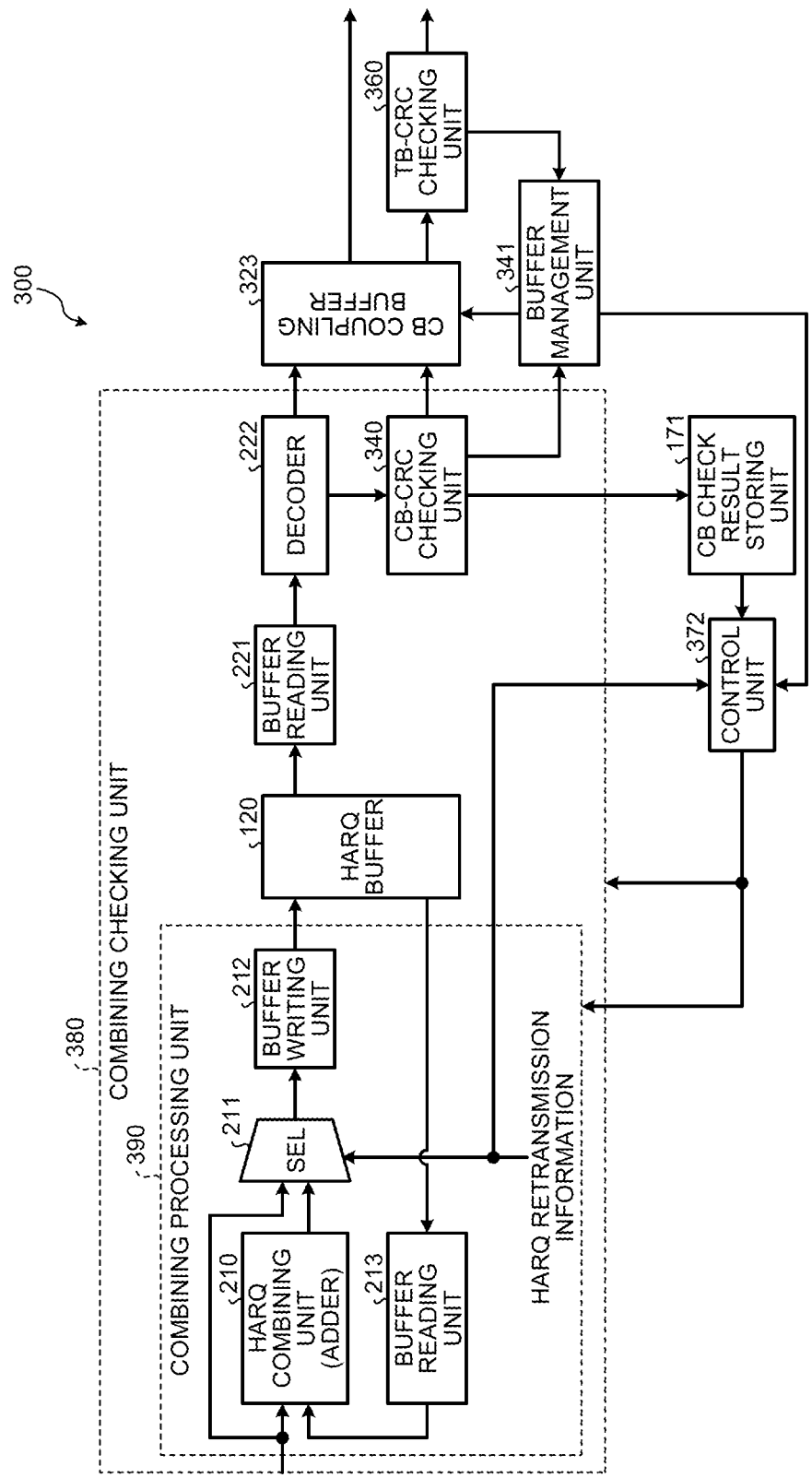
FIG. 10 is a schematic diagram illustrating an example configuration of a HARQ combining/coupling unit according to a fourth embodiment.

FIG. 10 is a schematic diagram illustrating an example configuration of a HARQ combining/coupling unit 300 according to a fourth embodiment. As illustrated in FIG. 10, the HARQ combining/coupling unit 300 includes the CB check result storing unit 171, a CB coupling buffer 323, a buffer management unit 341, a TB-CRC checking unit 360, a control unit 372, and a combining checking unit 380.

The CB coupling buffer 323 stores therein, for each HARQ process, code blocks that are coded by the decoder 222, which will be described later. However, the CB coupling buffer 323 stores therein a code block in a bank the number of which is less than the maximum number of HARQ processes.

Figure 11:
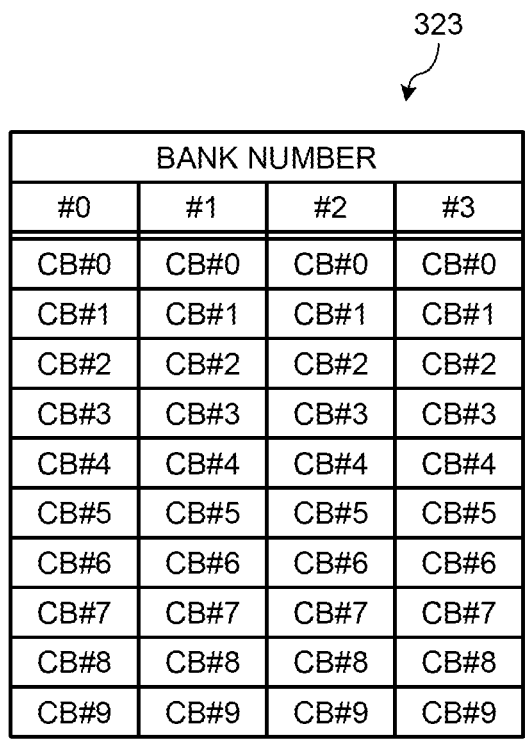
FIG. 11 is a schematic diagram illustrating an example of a CB coupling buffer according to the fourth embodiment.

FIG. 11 illustrates an example of the CB coupling buffer 323 according to the fourth embodiment. The CB coupling buffer 323 illustrated in FIG. 11 stores therein code blocks by associating them with the bank numbers that identify the banks. The CB coupling buffer 323 has four banks, which is less than the maximum number of HARQ processes, i.e., "8". In this case, it is assumed that the transport block is split into a maximum of 10 blocks; therefore, the CB coupling buffer 323 stores therein, for each bank number, a maximum of 10 code blocks.

Figure 12:
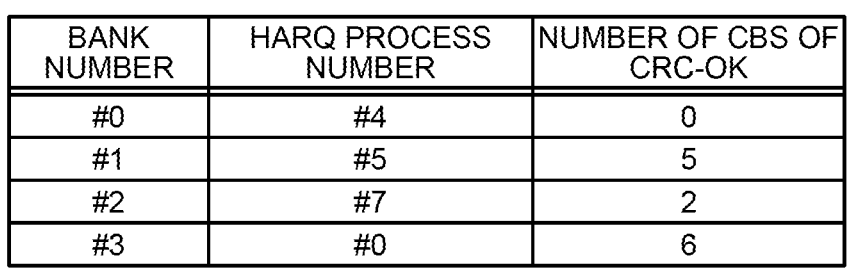
FIG. 12 is a schematic diagram illustrating an example of a buffer management unit according to the fourth embodiment.

The buffer management unit 341 stores therein, for example, HARQ process numbers of the code blocks stored in the CB coupling buffer 323 by associating the code blocks with the bank numbers. FIG. 12 illustrates an example of the buffer management unit 341 according to the fourth embodiment. The buffer management unit 341 illustrated in FIG. 12 has items, such as the "bank number", the "HARQ process number", and the "number of CBs of CRC-OK".

The "bank number" indicates a bank number for identifying the bank. The "HARQ process number" indicates a HARQ process number of the code block stored in the bank indicated by the associated bank number. The "number of CBs of CRC-OK" indicates, from among the code blocks stored in the bank indicated by the associated bank number, the number of code blocks in each of which an error is not detected by a CB-CRC checking unit 340, which will be described later.

For example, the data indicated in the first line in the buffer management unit 341 illustrated in FIG. 12 indicates that the HARQ process number of the code block stored in the bank corresponding to the bank number of "#0" is "#4". Furthermore, the data indicated in the first line in the buffer management unit 341 illustrated in FIG. 12 indicates that, from among code blocks stored in the bank corresponding to the bank number of "#0", the number of code blocks in each of which an error is not detected by the CB-CRC checking unit 340 is "0".

Furthermore, for example, the data indicated in the second line in the buffer management unit 341 illustrated in FIG. 12 indicates that the HARQ process number of the code block stored in the bank corresponding to the bank number of "#1" is "#5". Furthermore, the data indicated in the second line in the buffer management unit 341 illustrated in FIG. 12 indicates that, from the code blocks stored in the bank corresponding to the bank number of "#1", the number of code blocks in each of which an error is not detected by the CB-CRC checking unit 340 is "5".

In the example illustrated in FIG. 12, if "0" is stored in the item of the "number of CBs of CRC-OK", this indicates that the number of code blocks in each of which an error is not detected is "0" or indicates that an error is not detected in all of the code blocks. For example, from among the code blocks stored in the bank corresponding to the bank number of "#0", if the number of code blocks in each of which an error is not detected is "0", "0" is stored in the "number of CBs of CRC-OK", as illustrated in FIG. 12. Furthermore, for example, even if an error is not detected in all of the code blocks stored in the bank corresponding to the bank number of "#0", "0" is also stored in the "number of CBs of CRC-OK", as illustrated in FIG. 12. The reason for this is that, if "0" is stored in the "number of CBs of CRC-OK", this indicates that another HARQ process may use a bank indicated by the associated bank number.

The TB-CRC checking unit 360 reads, for each bank number from the CB coupling buffer 323, a code block and performs the error checking on the read transport block. For example, suppose that the information stored in the CB coupling buffer 323 is like that illustrated in FIG. 11. In such a case, the TB-CRC checking unit 360 reads, for example, the code blocks #0 to #9 stored in the bank number "#0" and performs the error checking on the transport block that is obtained by coupling the code blocks #0 to #9. Similarly, the TB-CRC checking unit 360 also performs the error checking on the code blocks #0 to #9 each stored in the bank numbers "#1" to "#3".

Furthermore, if an error is not detected in the transport block, the TB-CRC checking unit 360 updates, to "0", the "number of CBs of CRC-OK" stored in the buffer management unit 341 that is associated with the bank number of the bank that stores therein the subject transport block.

Referring back to FIG. 10, the combining checking unit 380 is controlled by the control unit 372, which will be described later. The combining checking unit 380 includes the HARQ buffer 120, the buffer reading unit 221, the decoder 222, the CB-CRC checking unit 340, and a combining processing unit 390. Furthermore, the combining processing unit 390 includes the HARQ combining unit 210, the SEL 211, the buffer writing unit 212, and the buffer reading unit 213.

If a signal is received from the transmitter 9, the control unit 372 determines whether the HARQ process number of the received signal is stored in the HARQ process number in the buffer management unit 341. If the HARQ process number of the received signal is stored in the buffer management unit 341, the control unit 372 acquires, from the buffer management unit 341, the bank number associated with the HARQ process number of the received signal. Then, the control unit 372 determines to retain the code block of the received signal in the bank in the CB coupling buffer 323 indicated by the acquired bank number. Then, the control unit 372 controls the operation of the combining checking unit 380.

Specifically, if the received signal is a first signal, the control unit 372 transmits the enable signal to the combining checking unit 380. Furthermore, if the received signal is a retransmission signal, the control unit 372 acquires, from the CB check result storing unit 171, an error checking result that matches the HARQ process number of the retransmission source signal and that matches the code block number of the likelihood signal that is input to the HARQ combining unit 210. Then, if the acquired error checking result is "1 (no error)", the control unit 372 transmits the disable signal to the combining checking unit 380. Furthermore, if the error checking result acquired from the CB check result storing unit 171 is "0 (error)", the control unit 372 transmits the enable signal to the combining checking unit 380.

In contrast, if the HARQ process number of the received signal is not stored in the buffer management unit 341, the control unit 372 acquires, from the buffer management unit 341, a bank number that stores therein the minimum "number of CBs of CRC-OK". Then, the control unit 372 determines to retain the code block of the received signal in the bank in the CB coupling buffer 323 indicated by the acquired bank number. Then, the control unit 372 controls the operation of the combining processing unit 390.

Specifically, if the received signal is a first signal, the control unit 372 transmits the enable signal to the buffer writing unit 212. Furthermore, if the received signal is a retransmission signal, the control unit 372 acquires, from the CB check result storing unit 171, an error checking result that matches the HARQ process number of the retransmission source signal and that matches the code block number of the likelihood signal that is input to the HARQ combining unit 210. Then, if the acquired error checking result is "1 (no error)", the control unit 372 transmits the disable signal to the combining processing unit 390. In contrast, if the error checking result acquired from the CB check result storing unit 171 is "0 (error)", the control unit 372 transmits the enable signal to the combining processing unit 390.

In the above case, if the HARQ process number of the received signal is not stored in the buffer management unit 341, the code block of the received signal is retained in the bank in which the "number of CBs of CRC-OK" is the minimum. The reason for this is that, when compared in a case in which "number of CBs of CRC-OK" is small, if the "number of CBs of CRC-OK" is large, a process performed by the combining checking unit 380 can be more frequently stopped, thus reducing the electrical power consumption. For example, it is assumed that the received signal is split into 10 code blocks. At this time, if the "number of CBs of CRC-OK" is "9" and if a retransmission signal is received, the control unit 372 stops the process performed by the combining checking unit 380 nine times. In contrast, if the "number of CBs of CRC-OK" is "2" and if a retransmission signal is received, the control unit 372 stops the process performed by the combining checking unit 380 twice.

Figure 13:
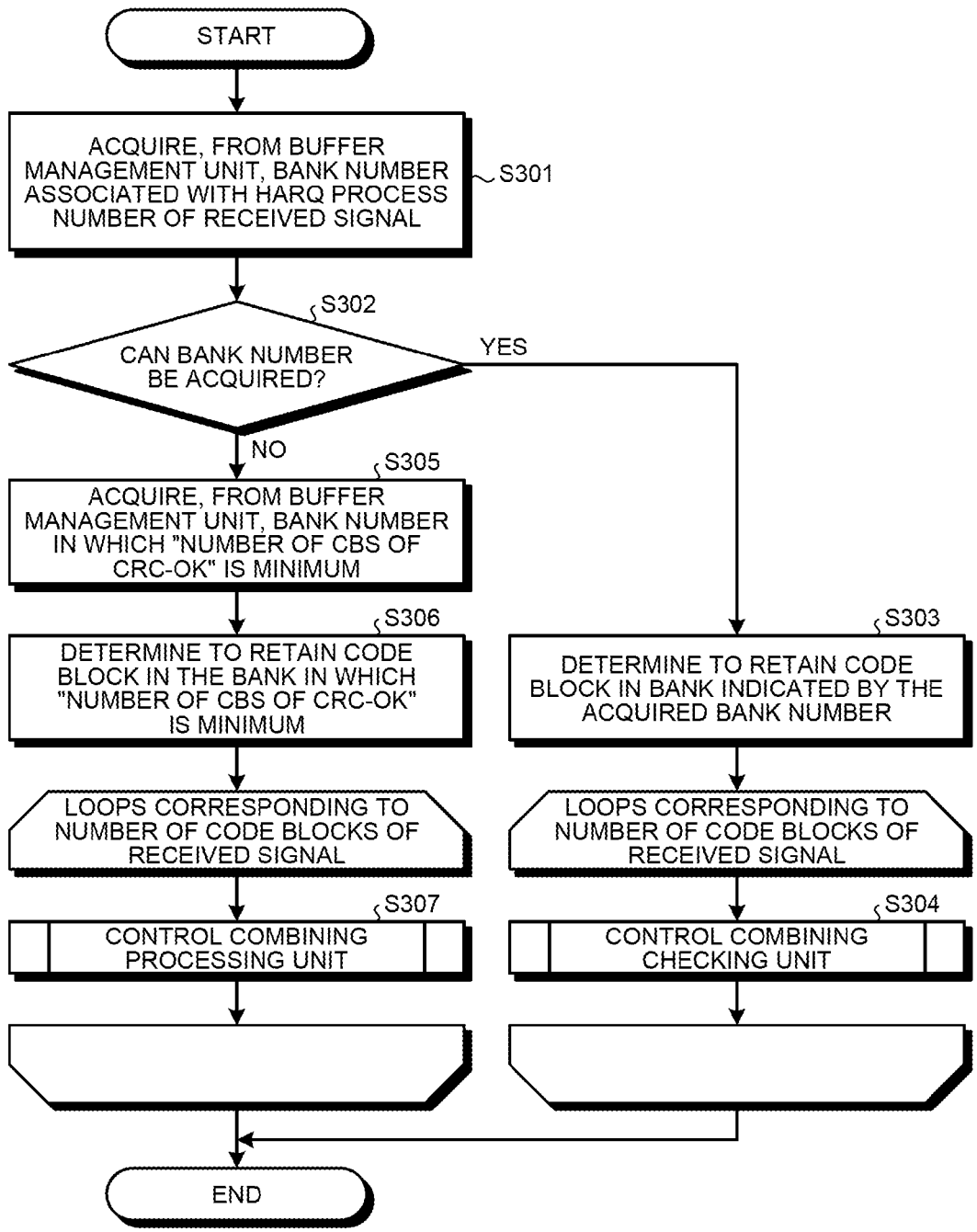
FIG. 13 is a flowchart illustrating the flow of a process performed by a control unit according to the fourth embodiment.

Flow of the Process Performed by the Control Unit According to the Fourth Embodiment In the following, the flow of the process performed by the control unit 372 according to the fourth embodiment will be described with reference to FIG. 13. FIG. 13 is a flowchart illustrating the flow of a process performed by the control unit 372 according to the fourth embodiment. As illustrated in FIG. 13, if a signal is received from the transmitter 9, the control unit 372 acquires, from the buffer management unit 341, the bank number associated with the HARQ process number of the received signal (Step S301).

Then, if the control unit 372 can acquire the bank number from the buffer management unit 341 (Yes at Step S302), the control unit 372 determines to retain the code block of the received signal in the bank in the CB coupling buffer 323 indicated by the acquired bank number (Step S303). Then, the control unit 372 repeatedly performs the control of the combining checking unit 380 by the number of times corresponding to the number of code blocks contained in the received signal (Step S304). The flow of the process for controlling the combining checking unit 380 performed at Step S304 is the same as that performed by the control unit 272 illustrated in FIG. 9.

In contrast, if the control unit 372 cannot acquire the bank number from the buffer management unit 341 (No at Step S302), the control unit 372 acquires, from the buffer management unit 341, the bank number that stores therein the minimum "number of CBs of CRC-OK" (Step S305). Then, the control unit 372 determines to retain the code block of the received signal in the bank in the CB coupling buffer 323 indicated by the acquired bank number (Step S306). Then, the control unit 372 repeatedly performs the control of the combining processing unit 390 by the number of times corresponding to the number of code blocks contained in the received signal (Step S307). The flow of the process for controlling the combining processing unit 390 performed at Step S307 is the same as that performed by the control unit 172 illustrated in FIG. 6.

Advantage of the Fourth Embodiment

As described above, the receiving apparatus according to the fourth embodiment retains code blocks for a received signal in the CB coupling buffer 323 that has banks, the number of which is smaller than the maximum number of HARQ processes. Accordingly, the receiving apparatus according to the fourth embodiment can use the CB coupling buffer 323 whose capacity is small, thus implementing the above configuration with a smaller-scale circuit. Specifically, the receiving apparatus according to the fourth embodiment can improve the throughput of the mobile communication system with a smaller-scale circuit and thus reduce the electrical power consumption.

[e] Fifth Embodiment

In the fourth embodiment, as in the example illustrated in FIG. 11, the CB coupling buffer 323 retains a region that stores therein a maximum of 10 code blocks for each bank. However, the signal received by the receiving apparatus is not always split into the same number. In a fifth embodiment, an example will be described by taking into consideration the number of received signals to be split differs.

Configuration of a Receiving Apparatus According to the Fifth Embodiment

First, the configuration of a receiving apparatus according to the fifth embodiment will be described. The configuration of the mobile communication system that uses the receiving apparatus according to the fifth embodiment is the same as that illustrated in FIG. 2. However, when compared with the receiving apparatus 20 illustrated in FIG. 2, the configuration of the HARQ combining/coupling unit 100 included in the receiving apparatus 20 differs from a HARQ combining/coupling unit included in the receiving apparatus according to the fifth embodiment. Furthermore, the configuration of the HARQ combining/coupling unit according to the fifth embodiment is the same as that of the HARQ combining/coupling unit 300 illustrated in FIG. 10. However, when compared with the HARQ combining/coupling unit 300 illustrated in FIG. 10, in the HARQ combining/coupling unit according to the fifth embodiment, the structure of the CB coupling buffer 323 or the buffer management unit 341 differs. Accordingly, a CB coupling buffer according to the fifth embodiment is denoted by a CB coupling buffer 423 and a buffer management unit according to the fifth embodiment is denoted by a buffer management unit 441.

Figures 14, 15:
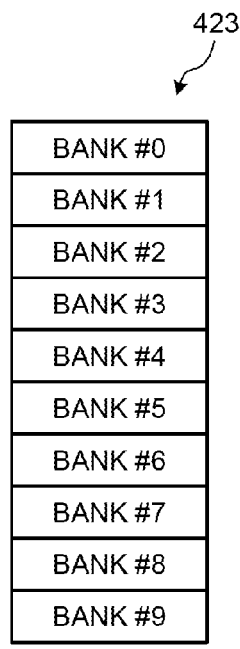
FIG. 14 is a schematic diagram illustrating an example of a CB coupling buffer according to a fifth embodiment.
FIG. 15 is a schematic diagram illustrating an example of a buffer management unit according to the fifth embodiment.

FIG. 14 illustrates an example of the CB coupling buffer 423 according to the fifth embodiment. The CB coupling buffer 423 illustrated in FIG. 14 has 10 banks. In the example illustrated in FIG. 14, a single bank has the size of retaining one code block.

FIG. 15 illustrates an example of the buffer management unit 441 according to the fifth embodiment. The buffer management unit 441 illustrated in FIG. 15 has items indicating the "bank number", the "HARQ process number", the "code block number", and the "number of CBs of CRC-OK". The "bank number" indicates the bank number for identifying the bank. The "HARQ process number" indicates a HARQ process number of a code block stored in a bank indicated by an associated bank number. The "code block number" indicates a code block number of a code block stored in a bank indicated by an associated bank number. The "number of CBs of CRC-OK" indicates, from among the signals transmitted in the HARQ process indicated by the associated HARQ process number, the number of code blocks in each of which an error is not detected by the CB-CRC checking unit 340.

For example, the data indicated in the first line in the buffer management unit 441 illustrated in FIG. 15 indicates that the HARQ process number of the code block stored in the bank corresponding to the bank number of "#0" is "#4" and indicates that the code block number of the subject code block is "#0". Furthermore, the data indicated in the first to third lines in the buffer management unit 441 illustrated in FIG. 15 indicates that, from among the signals transmitted in the HARQ process indicated by the HARQ process number "#4", the number of code blocks in each of which an error is not detected by the CB-CRC checking unit 340 is "3".

In accordance with various kinds of information stored in the buffer management unit 441, the control unit 372 according to the fifth embodiment determines a bank that is used to retain the code block of the received signal. A process performed by the control unit 372 according to the fifth embodiment will be described in detail with reference to FIG. 16.

Figure 16:
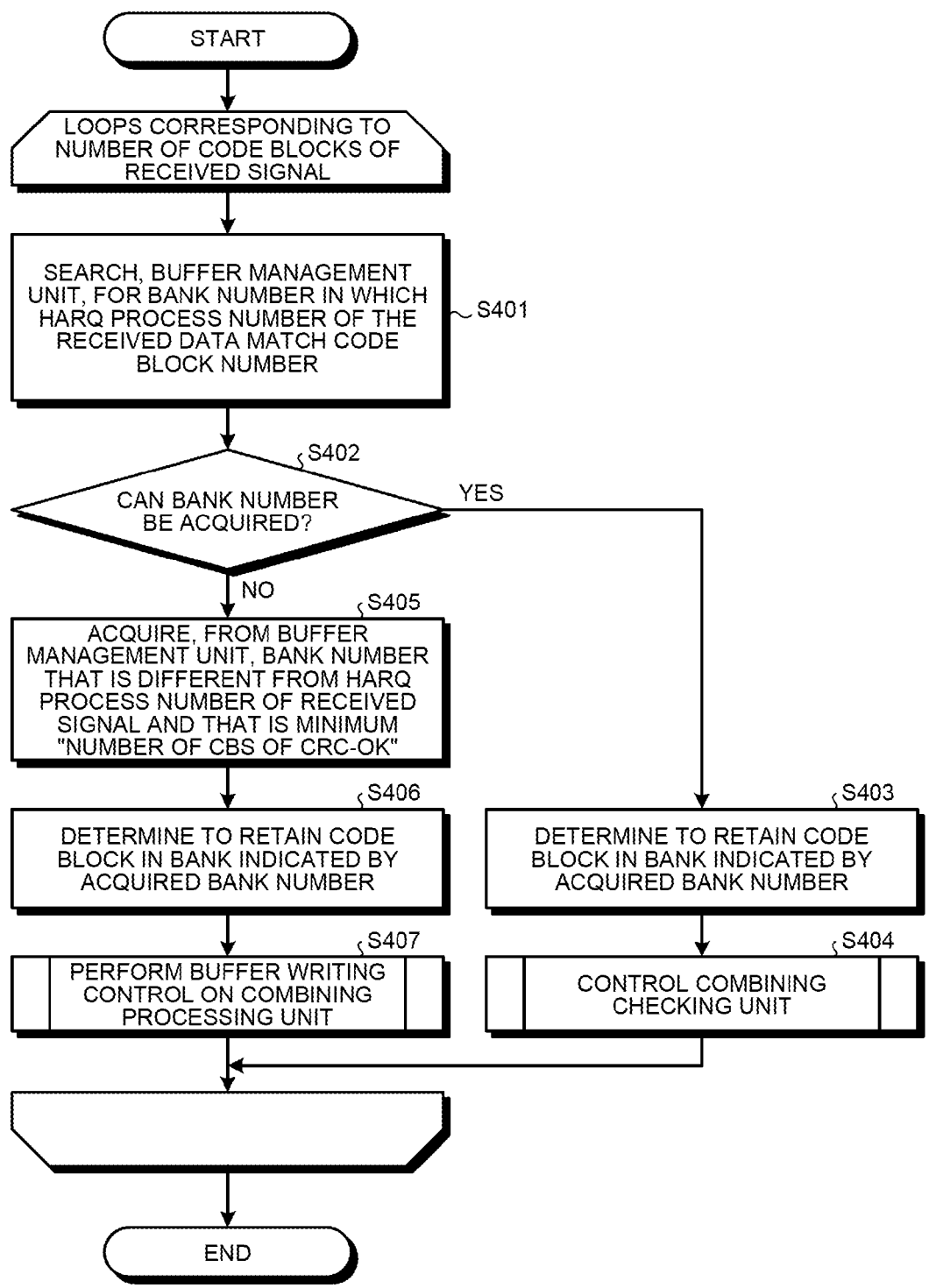
FIG. 16 is a flowchart illustrating the flow of a process performed by a control unit according to the fifth embodiment.

Flow of a Process Performed by the Control Unit According to the Fifth Embodiment In the following, a process performed by the control unit 372 according to the fifth embodiment will be described with reference to FIG. 16. FIG. 16 is a flowchart illustrating the flow of a process performed by the control unit 372 according to the fifth embodiment. As illustrated in FIG. 16, if the control unit 372 receives a signal from the transmitter 9, the control unit 372 repeatedly performs the process described below by the number of times corresponding to the number of code blocks contained in the received signal (Steps S401 to S406).

Specifically, the control unit 372 acquires, from the buffer management unit 441, a bank number that matches the HARQ process number of the received signal and acquires, from the rate dematching unit 25, a bank number that matches the code block number of the likelihood signal that is input to the HARQ combining unit 210 (Step S401).

If the control unit 372 can acquire the bank number from the buffer management unit 441 (Yes at Step S402), the control unit 372 determines to retain the code block in the bank in the CB coupling buffer 423 indicated by the acquired bank number (Step S403). Then, the control unit 372 controls the combining checking unit 380 (Step S404). The flow of the process for controlling the combining checking unit 380 performed at Step S404 is the same as that performed by the control unit 272 illustrated in FIG. 9.

Specifically, if a received signal is a first signal, the control unit 372 transmits the enable signal to the combining checking unit 380. Furthermore, if the received signal is the first signal, the control unit 372 acquires, from the CB check result storing unit 171, an error checking result that matches the HARQ process number of the received signal and that matches the code block number of the likelihood signal that is input to the HARQ combining unit 210. Then, if the acquire error checking result is "1 (no error)", the control unit 372 transmits the disable signal to the combining checking unit 380. Furthermore, if the error checking result acquired from the CB check result storing unit 171 is "0 (error)", the control unit 372 transmits the enable signal to the combining checking unit 380.

In contrast, if the control unit 372 cannot acquire the bank number (No at Step S402), the control unit 372 acquires, from the buffer management unit 441, the bank number that is different from the HARQ process number of the received signal and that is the minimum "number of CBs of CRC-OK" (Step S405). Then, the control unit 372 determines to retain the code block in the bank in the CB coupling buffer 423 indicated by the acquired bank number (Step S406). Then, the control unit 372 controls the combining processing unit 390 (Step S407).

Specifically, if a received signal is a first signal, the control unit 372 transmits the enable signal to the buffer writing unit 212. Furthermore, if a received signal is a retransmission signal, the control unit 372 acquires, from the CB check result storing unit 171, an error checking result that matches the HARQ process number of the received signal and that matches the code block number of the likelihood signal that is input to the HARQ combining unit 210. Then, if the acquired error checking result is "1 (no error)", the control unit 372 transmits the disable signal to the buffer writing unit 212. In contrast, if the error checking result acquired from the CB check result storing unit 171 is "0 (error)", the control unit 372 transmits the enable signal to the buffer writing unit 212.

Advantage of the Fifth Embodiment

As described above, the receiving apparatus according to the fifth embodiment retains the code block of the received signal in a free bank in the CB coupling buffer 423 instead of arranging, in the CB coupling buffer 423 for each HARQ process, storage areas the number of which is the maximum number of splits of the transport block. Accordingly, the receiving apparatus according to the fifth embodiment can retain the code block by using a minimum free region in the CB coupling buffer 423. Accordingly, the receiving apparatus according to the fifth embodiment can use the CB coupling buffer 423 having a smaller capacity, thus implementing the above configuration with a smaller-scale circuit. Specifically, the receiving apparatus according to the fifth embodiment can improve the throughput of the mobile communication system with a smaller-scale circuit and thus reduce the electrical power consumption.

[f] Sixth Embodiment

In the second to the fifth embodiments described above, an example is described in which the encoded code block is retained in the CB coupling buffer. However, the code block may also be retained in a storage area other than the CB coupling buffer. Accordingly, in a sixth embodiment, an example case will be described in which the code block is retained in the storage area other than the CB coupling buffer.

Configuration of a Receiving Apparatus According to the Sixth Embodiment

First, the configuration of a receiving apparatus according to the sixth embodiment will be described. The configuration of the mobile communication system that uses the receiving apparatus according to the sixth embodiment is the same as that illustrated in FIG. 2. However, when compared with the receiving apparatus 20 illustrated in FIG. 2, the configuration of the HARQ combining/coupling unit 100 included in the receiving apparatus 20 differs from a HARQ combining/coupling unit included in the receiving apparatus according to the sixth embodiment.

Figure 17:
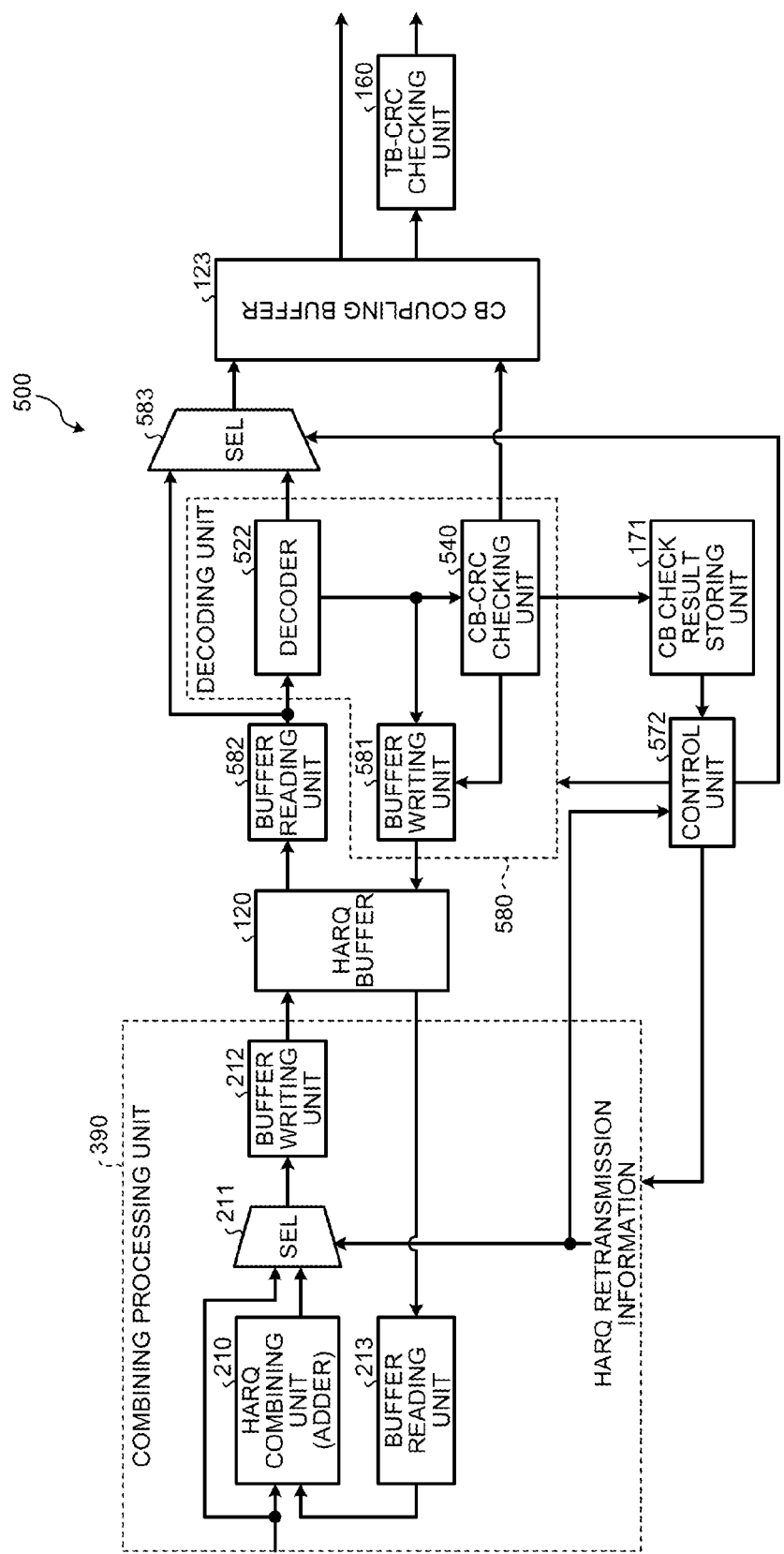
FIG. 17 is a schematic diagram illustrating an example configuration of a HARQ combining/coupling unit according to a sixth embodiment.

FIG. 17 is a schematic diagram illustrating an example configuration of a HARQ combining/coupling unit 500 according to a sixth embodiment. As illustrated in FIG. 17, the HARQ combining/coupling unit 500 includes the HARQ buffer 120, the CB coupling buffer 123, the TB-CRC checking unit 160, the CB check result storing unit 171, the combining processing unit 390, a control unit 572, a decoding unit 580, a buffer reading unit 582, and a SEL 583.

If a received signal is a first signal, the control unit 572 transmits the enable signal to the combining processing unit 390 and the decoding unit 580. Furthermore, if a received signal is a retransmission signal, the control unit 572 acquires, from the CB check result storing unit 171, an error checking result that matches the HARQ process number of the retransmission source signal and that matches the code block number of the likelihood signal that is input to the HARQ combining unit 210. Then, if the acquired error checking result is "1 (no error)", the control unit 572 transmits the disable signal to the combining processing unit 390 and the decoding unit 580. In contrast, if the error checking result is "0 (error)", the control unit 572 transmits the enable signal to the combining processing unit 390 and the decoding unit 580.

The decoding unit 580 is controlled by the control unit 572. As illustrated in FIG. 17, the decoding unit 580 includes a decoder 522, a CB-CRC checking unit 540, and a buffer writing unit 581.

If the decoder 522 receives the disable signal from the control unit 572, the decoder 522 does not process anything. Furthermore, if the decoder 522 receives the enable signal from the control unit 572, the decoder 522 performs the error correction or the decoding on the likelihood signal received from the buffer reading unit 582, which will be described later.

If the CB-CRC checking unit 540 receives the disable signal from the control unit 572, the CB-CRC checking unit 540 does not process anything. Furthermore, if the CB-CRC checking unit 540 receives the enable signal from the control unit 572, the CB-CRC checking unit 540 performs the error checking on the code block received from the decoder 522. Then, the CB-CRC checking unit 540 retains the result of the error checking in the CB check result storing unit 171 and outputs the result of the error checking to the buffer writing unit 581.

If the buffer writing unit 581 receives the disable signal from the control unit 572, the buffer writing unit 581 does not process anything. Furthermore, if the buffer writing unit 581 receives the enable signal from the control unit 572, the buffer writing unit 581 determines whether an error is detected by the CB-CRC checking unit 540. Then, if an error is detected by the CB-CRC checking unit 540, the buffer writing unit 581 does not process anything.

In contrast, an error is not detected by the CB-CRC checking unit 540, the buffer writing unit 581 retains the code block received from the decoder 522 in the HARQ buffer 120. At this time, the buffer writing unit 581 retains the code block received from the decoder 522 in a region of the HARQ buffer 120 that stores therein the likelihood signal for which the code block has not been decoded. The reason for this is the likelihood signal, for which the code block that has not been decoded and that does not contain an error, is not subjected to maximum ratio combining with the retransmission signal, which will be received later; therefore, the subject likelihood signal does not need to be retained in the HARQ buffer 120.

If the buffer reading unit 582 reads the likelihood signal from the HARQ buffer 120, the buffer reading unit 582 outputs the read likelihood signal to the decoder 522. Furthermore, if a received signal is a first signal or if a received signal is a retransmission signal and the enable signal is transmitted from the control unit 572 to both the combining processing unit 390 and the decoding unit 580, the buffer reading unit 582 reads the likelihood signal from the HARQ buffer 120.

In contrast, if the buffer reading unit 582 reads the code block from the HARQ buffer 120, the buffer reading unit 582 outputs the read code block to the SEL 583. Furthermore, if a received signal is a retransmission signal and if the disable signal is transmitted from the control unit 572 to both the combining processing unit 390 and the decoding unit 580, the buffer reading unit 582 reads the code block from the HARQ buffer 120.

The SEL 583 retains, in the CB coupling buffer 123, either one of the code block received from the decoder 522 or the code block received from the buffer reading unit 582. Specifically, if a received signal is a first signal, the SEL 583 receives the code block from the decoder 522 and retains the received code block in the CB coupling buffer 123. Furthermore, if a received signal is a retransmission signal, the SEL 583 receives a code block from either one of the decoder 522 or the buffer reading unit 582 and retains the received code block in the CB coupling buffer 123.

Figure 18:
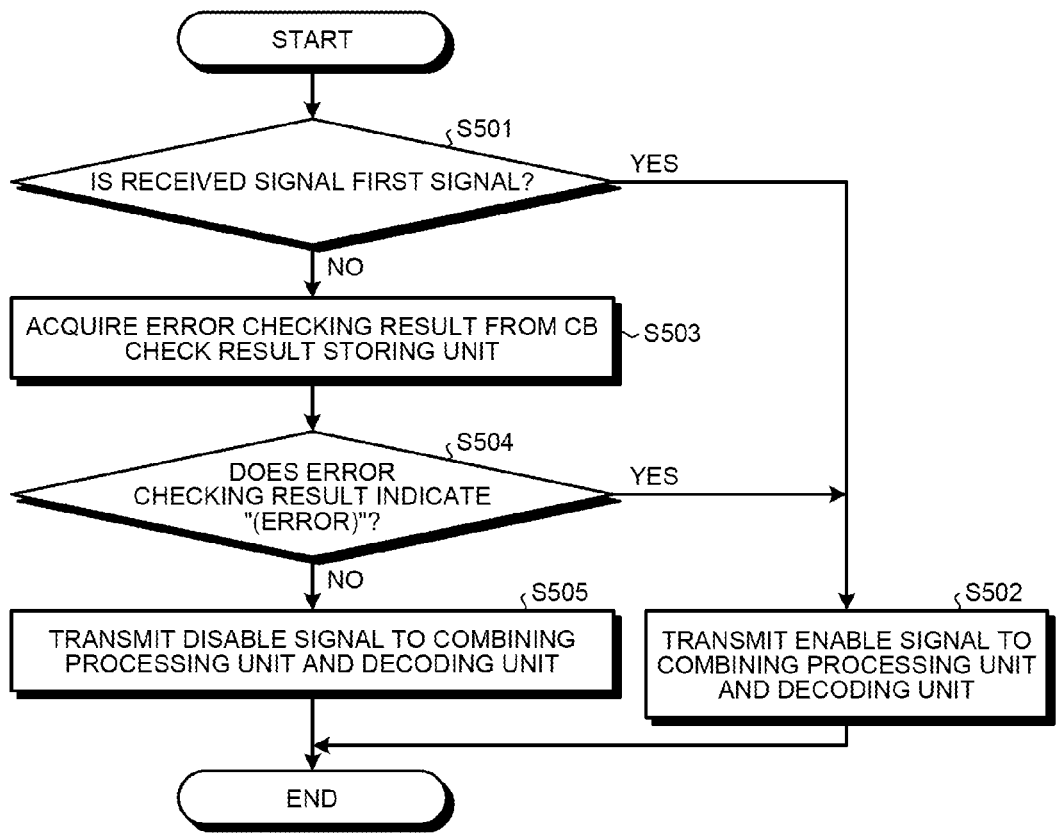
FIG. 18 is a flowchart illustrating the flow of a process performed by a control unit according to the sixth embodiment.

Flow of a Process Performed by the Control Unit According to the Sixth Embodiment In the following, the flow of the process performed by the control unit 572 according to the sixth embodiment will be described with reference to FIG. 18. FIG. 18 is a flowchart illustrating the flow of a process performed by the control unit 572 according to the sixth embodiment. As illustrated in FIG. 18, if a received signal is a first signal (Yes at Step S501), the control unit 572 transmits the enable signal to both the combining processing unit 390 and the decoding unit 580 (Step S502).

In contrast, if a received signal is a retransmission signal (No at Step S501), the control unit 572 acquires an error checking result from the CB check result storing unit 171 (Step S503). Specifically, the control unit 572 acquires, from the CB check result storing unit 171, an error checking result that matches the HARQ process number of the retransmission source signal and that matches the code block number of the likelihood signal that is input to the HARQ combining unit 210.

Then, if the error checking result acquired at Step S503 is "1 (no error)" (No at Step S504), the control unit 572 transmits the disable signal to both the combining processing unit 390 and the decoding unit 580 (Step S505). In contrast, if the error checking result acquired at Step S503 is "0 (error)" (Yes at Step S504), the control unit 572 transmits the enable signal to both the combining processing unit 390 and the decoding unit 580 (Step S502).

Figure 19:
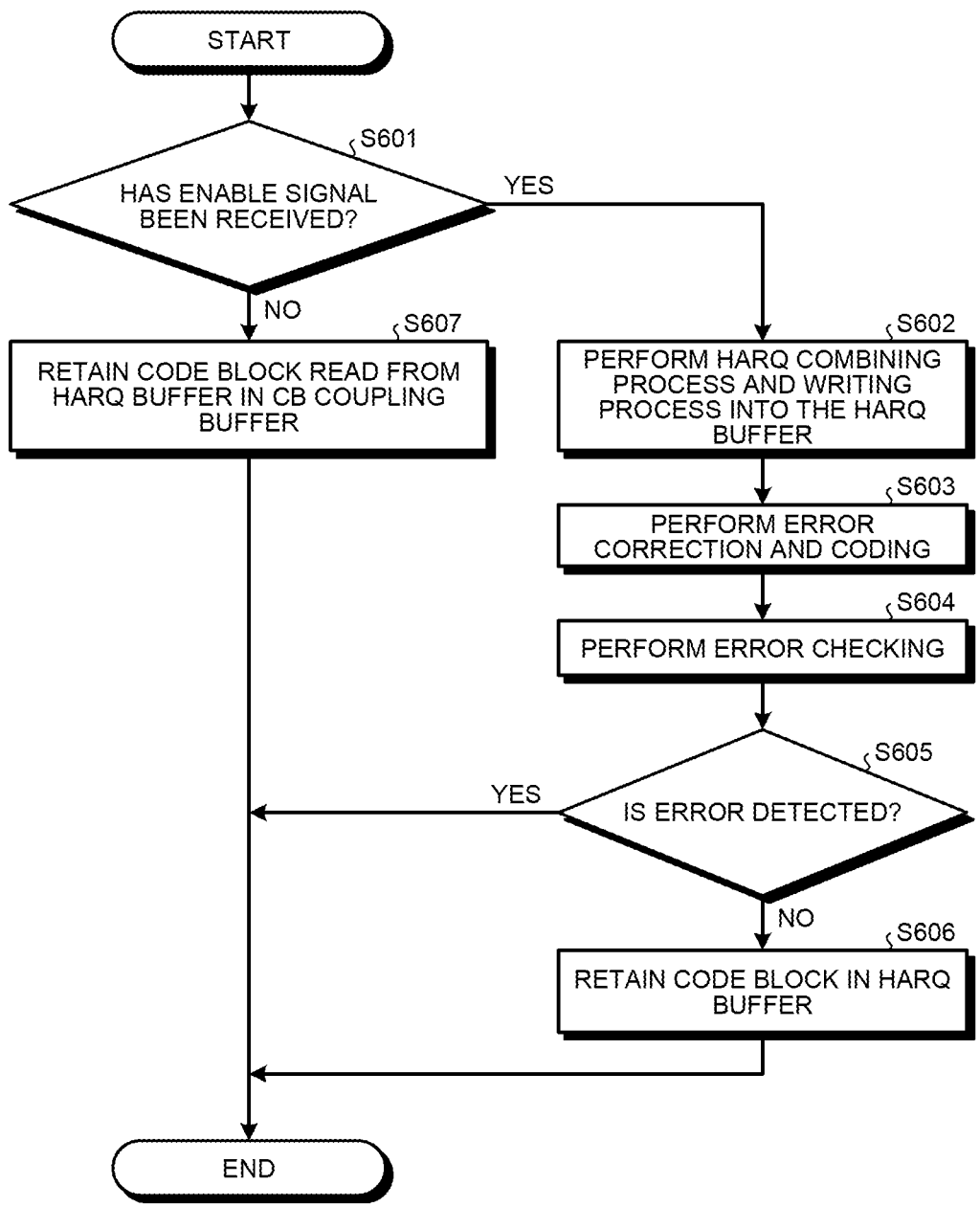
FIG. 19 is a flowchart illustrating the flow of a process performed by a combining processing unit and a decoding unit according to the sixth embodiment.

Flow of the Process Performed by the Combining Processing Unit and the Decoding Unit According to the Sixth Embodiment In the following, the flow of the process performed by the combining processing unit 390 and the decoding unit 580 according to the sixth embodiment will be described with reference to FIG. 19. FIG. 19 is a flowchart illustrating the flow of a process performed by the combining processing unit 390 and the decoding unit 580 according to the sixth embodiment.

As illustrated in FIG. 19, if the enable signal is transmitted from the control unit 572 (Yes at Step S601), the combining processing unit 390 performs a HARQ combining process or a writing process into the HARQ buffer 120 (Step S602). Specifically, if a received signal is a retransmission signal, the HARQ combining unit 210 of the combining processing unit 390 performs the HARQ combining process. Furthermore, the buffer writing unit 212 in the combining processing unit 390 writes, into the HARQ buffer 120, the likelihood signal received from the SEL 211.

At this time, the buffer reading unit 582 reads the likelihood signal from the HARQ buffer 120. Then, the decoder 522 in the decoding unit 580 performs the error correction or the coding on the likelihood signal that is read from the buffer reading unit 582 (Step S603). Subsequently, the CB-CRC checking unit 540 in the decoding unit 580 performs the error checking on the code block decoded by the decoder 522 (Step S604).

Then, if an error is detected by the CB-CRC checking unit 540 (Yes at Step S605), the buffer writing unit 581 in the decoding unit 580 ends the process without retaining the code block decoded by the decoder 522 in the HARQ buffer 120. In contrast, if an error is not detected by the CB-CRC checking unit 540 (No at Step S605), the buffer writing unit 581 retains the code block that is input from the decoder 522 in the HARQ buffer 120 (Step S606). At this time, the control unit 572 controls the SEL 583 such that the SEL 583 does not retain the code block in the CB coupling buffer 123.

Furthermore, if the disable signal is received from the control unit 572 (No at Step S601), the combining processing unit 390 and the decoding unit 580 do not perform process. At this time, the buffer reading unit 582 read the code block from the HARQ buffer 120. Then, the SEL 583 retains the code block read by the buffer reading unit 582 in the CB coupling buffer 123 (Step S607).

Advantage of the Sixth Embodiment

As described above, if an error is not detected in the code block, the receiving apparatus according to the sixth embodiment retains the subject code block in the HARQ buffer 120. Accordingly, the receiving apparatus according to the sixth embodiment can use the CB coupling buffer 123 having a smaller capacity, thus implementing the above configuration with a smaller-scale circuit. Specifically, the receiving apparatus according to the sixth embodiment can improve the throughput of the mobile communication system with a smaller-scale circuit and reduce the electrical power consumption.

In the sixth embodiment described above, a case of using the CB coupling buffer 123 illustrated in FIG. 4 is described as an example; however, the receiving apparatus according to the sixth embodiment may also use the CB coupling buffer 323 illustrated in FIG. 11 or the CB coupling buffer 423 illustrated in FIG. 14. In such a case, the receiving apparatus according to the sixth embodiment retains, in the HARQ buffer 120, the code block in which an error is not detected, whereas retains, in the CB coupling buffer 323 or the CB coupling buffer 423, the code block in which an error is detected.

[g] Seventh Embodiment

The receiving apparatus and the units disclosed in the present invention can be implemented with various kinds of embodiments other than the embodiments described above. Accordingly, in a seventh embodiment, another embodiment of the receiving apparatus and the units disclosed in the present invention will be described.

Mobile Communication System

In the second to sixth embodiments, a description is given of the mobile communication system in which the communication standard is LTE as an example; however, the receiving apparatus and the units disclosed in the present invention may also be used in a mobile communication system in which the communication standard is other than LTE. Specifically, if a retransmission process is performed on transmitted/received signals; if the transmitted/received signals are split on the transmission side and the reception side; and if a retransmission signal is received on the reception side, the receiving apparatus and the units disclosed in the present invention can be used in a mobile communication system that performs a combining process in split signal units.

System Configuration, etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. For example, the HARQ combining unit 110 and the buffer reading unit 113 illustrated in FIG. 3 may also be integrated.

Program

The various processes performed in the embodiments described above can be implemented by programs prepared in advance and executed by a computer system such as a personal computer or a workstation. Accordingly, in the following, a computer that executes a mobile terminal control program having the same function performed by the receiving apparatus 10 illustrated in FIG. 1 will be described as an example with reference to FIG. 20.

Figure 20:
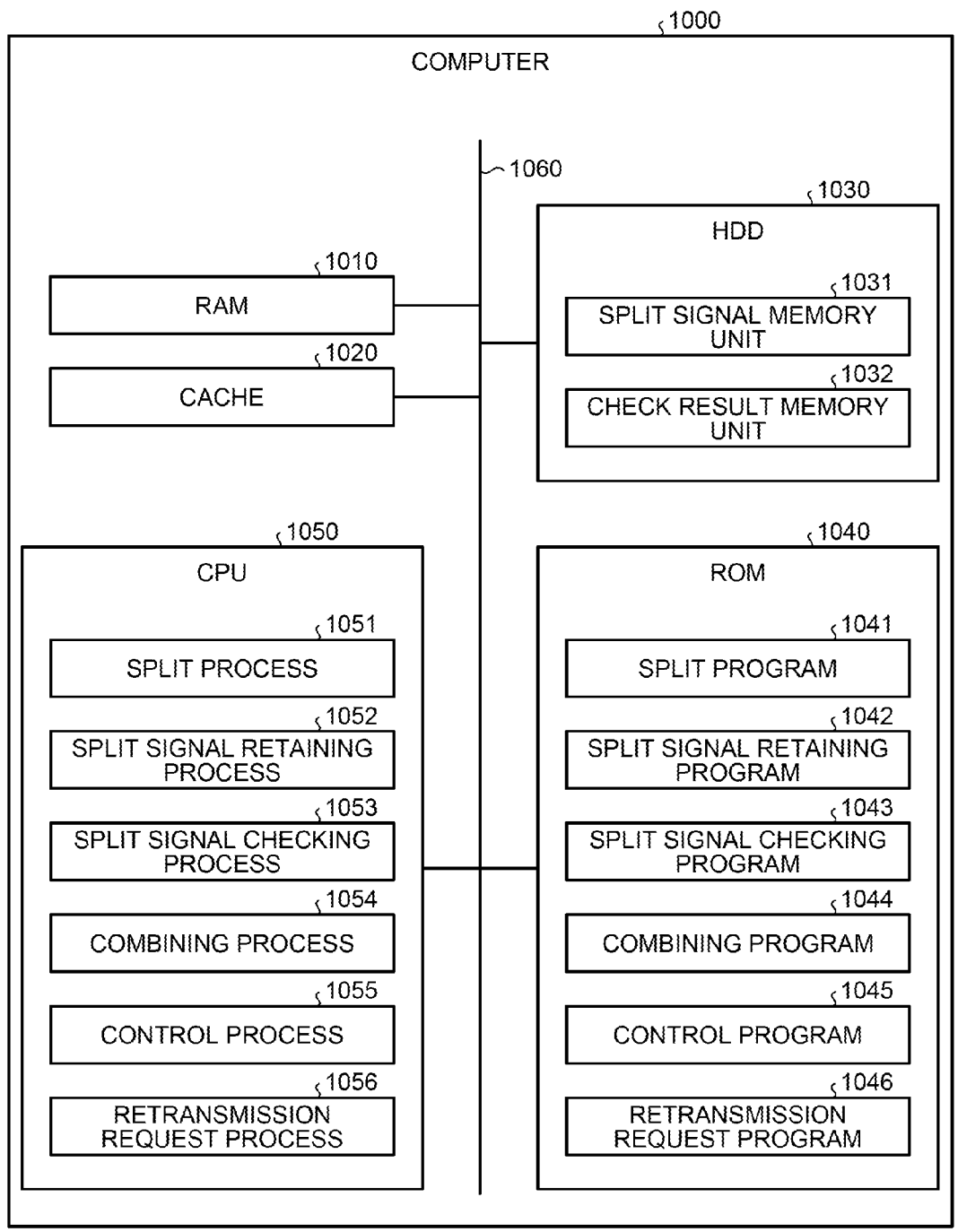
FIG. 20 is a schematic diagram illustrating a computer that executes a mobile terminal control program.

FIG. 20 is a schematic diagram illustrating a computer that executes a mobile terminal control program. As illustrated in FIG. 20, a computer 1000 includes a random access memory (RAM) 1010, a cache 1020, an HDD 1030, a read only memory (ROM) 1040, a central processing unit (CPU) 1050, and a bus 1060. The RAM 1010, the cache 1020, the HDD 1030, the ROM 1040, and the CPU 1050 are connected via the bus 1060.

The ROM 1040 stores therein, in advance, the reception control program having the same function as that performed by the receiving apparatus 10 illustrated in FIG. 1. Specifically, the ROM 1040 stores therein a split program 1041, a split signal retaining program 1042, a split signal checking program 1043, a combining program 1044, a control program 1045, and a retransmission request program 1046.

Then, the CPU 1050 reads, from the ROM 1040, the split program 1041, the split signal retaining program 1042, the split signal checking program 1043, the combining program 1044, the control program 1045, and the retransmission request program 1046 and executes them.

By doing so, as illustrated in FIG. 20, the split program 1041 functions as a split process 1051, the split signal retaining program 1042 functions as a split signal retaining process 1052, the split signal checking program 1043 functions as a split signal checking process 1053, the combining program 1044 functions as a combining process 1054, the control program 1045 functions as a control process 1055, and the retransmission request program 1046 functions as a retransmission request process 1056.

The split process 1051 corresponds to the splitting unit 11 illustrated in FIG. 1. The split signal retaining process 1052 corresponds to the split signal retaining unit 12 illustrated in FIG. 1. The split signal checking process 1053 corresponds to the split signal checking unit 14 illustrated in FIG. 1. The combining process 1054 corresponds to the combining unit 16 illustrated in FIG. 1. The control process 1055 corresponds to the control unit 17 illustrated in FIG. 1. The retransmission request process 1056 corresponds to the retransmission requesting unit 18 illustrated in FIG. 1.

Furthermore, as illustrated in FIG. 20, the HDD 1030 stores therein a split signal memory unit 1031 and a check result memory unit 1032. The split signal memory unit 1031 corresponds to the split signal storing unit 13 illustrated in FIG. 1. The check result memory unit 1032 corresponds to the check result storing unit 15 illustrated in FIG. 1.

The above-described programs 1041 to 1046 are not always stored in the ROM 1040. For example, the programs 1041 to 1046 may also be stored in a "portable physical medium", such as a flexible disk (FD), a CD-ROM, a DVD disk, a magneto-optic (MO) disk, an IC CARD, or the like that can be inserted into the computer 1000. Alternatively, the programs 1041 to 1046 may also be stored in a "fixed physical medium", such as a hard disk drive (HDD), that can be arranged inside/outside the computer 1000. Alternatively, the programs 1041 to 1046 may also be stored in "another computer (or a server)" connected to the computer 1000 via a public circuit, the Internet, a LAN, a WAN, or the like. Then, the computer 1000 may also read and execute each program from the flexible disk or the like described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving apparatus comprising:
a splitting unit that splits a received signal received from a predetermined transmitter into a predetermined size;
a split signal retaining unit that retains split signals obtained by the splitting unit in a split signal storing unit;
a split signal checking unit that performs error checking on each of split signals stored in the split signal storing unit;
a check result storing unit that stores therein a result of the error checking performed by the split signal checking unit;
a combining unit that combines, when a retransmission signal is received, a split signal that is obtained by the splitting unit splitting the retransmission signal and a split signal that is stored in the split signal storing unit;
a decoding unit that decodes the split signals stored in the split signal storing unit;
a decoded data storing unit that stores therein decoded data decoded by the decoding unit;
a control unit that performs a signal update control by controlling, among the split signals stored in the split signal storing unit, not to update the split signal for which an error checking result does not indicate an error and by controlling to update the split signal for which an error checking result indicates an error to a combined signal combined by the combining unit; and
a retransmission requesting unit that sends, when an error is contained in a split signal stored in the split signal storing unit, a request to the transmitter to retransmit the retransmission signal, wherein
the control unit, performs a decoded data update control by controlling decoded data associated with the split signal, from among decoded data stored in the decoded data storing unit and for which the error checking result stored in the check result storing unit does not indicate an error, such that the split signal is not updated and by controlling decoded data associated with the split signal, from among decoded data stored in the decoded data storing unit and for which the error checking result stored in the check result storing unit indicates an error, such that the decoded data is updated to the decoded data decoded by the decoding unit, the transmitter performs a retransmission process on multiple signals by using multiple processes, the decoded data storing unit stores the decoded data in a predetermined number of banks, the control unit performs the signal update control, when a bank for storing the decoded data for the retransmission signal is not reserved in the decoded data storing unit, and the control unit performs the decoded data update control when a bank for storing the decoded data for the retransmission signal is reserved in the decoded data storing unit.

2. The receiving apparatus according to claim 1, wherein, when an error is not detected in the decoded data by the split signal checking unit, the control unit retains the decoded data in the split signal storing unit.

3. The receiving apparatus according to claim 1, wherein, the control unit stops, at the signal update control, the split signal retaining unit and the combining unit, when the error checking result acquired from the check result storing unit does not indicate an error, and the control unit allows the split signal retaining unit and the combining unit to perform processing, when the error checking result acquired from the check result storing unit indicates an error.

4. The receiving apparatus according to claim 1, wherein, the control unit stops, at the decoded data update control, the split signal retaining unit, the combining unit, and the decoding unit, when the error checking result acquired from the check result storing unit does not indicate an error, and the control unit allows the split signal retaining unit, the combining unit, and the decoding unit to perform processing, when the error checking result acquired from the check result storing unit indicates an error.

5. A receiving method performed by a receiving apparatus that receives a signal from a predetermined transmitter, the receiving method comprising:

first splitting a received signal received from the transmitter into a predetermined size;

retaining split signals obtained at the first splitting in a split signal storing unit;

performing error checking on each of the split signals stored in the split signal storing unit and retaining a result of the error checking in a check result storing unit;

sending a request, when an error is contained in a coupled signal obtained by coupling the split signals stored in the split signal storing unit, to the transmitter to retransmit the received signal, the transmitter performing a retransmission process on multiple signals by using multiple processes;

second splitting, when a retransmission signal associated with the received signal is received, the retransmission signal into a predetermined size;

combining a split signal stored in the split signal storing unit and a split signal split at the second splitting;

decoding the split signals stored in the split signal storing unit;

storing decoded data decoded by the decoding in a predetermined number of banks of a decoded data storing unit;

controlling, among the split signals stored in the split signal storing unit, not to update the split signal for which an error checking result does not indicate an error and controlling to update the split signal for which an error checking result indicates an error to a combined signal combined at the combining; controlling decoded data associated with the split signal, from among decoded data stored in the decoded data storing unit and for which the error checking result stored in the check result storing unit does not indicate an error, such that the split signal is not updated and controlling decoded data associated with the split signal, from among decoded data stored in the decoded data storing unit and for which the error checking result stored in the check result storing unit indicates an error, such that the decoded data is updated to the decoded data decoded by the decoding;

controlling to update the signal, when a bank for storing the decoded data for the retransmission signal is not reserved in the decoded data storing unit; and controlling to update the decoded data when a bank for storing the decoded data for the retransmission signal is reserved in the decoded data storing unit.

6. A non-transitory computer readable storage medium having stored therein a reception control program for controlling a receiving apparatus that receives a signal from a predetermined transmitter, the reception control program causing a computer to execute a process comprising:

splitting a received signal received from the transmitter into a predetermined size;

retaining split signals obtained at the splitting in a split signal storing unit;

performing error checking on each of the split signals stored in the split signal storing unit and retaining a result of the error checking in a check result storing unit;

combining, when a retransmission signal is received, a split signal obtained by splitting the retransmission signal at the splitting and a split signal stored in the split signal storing unit;

decoding the split signals stored in the split signal storing unit;

storing decoded data decoded by the decoding in a predetermined number of banks of a decoded data storing unit;

controlling, among the split signals stored in the split signal storing unit, not to update the split signal for which an error checking result does not indicate an error and controlling to update the split signal for which an error checking result indicates an error to a combined signal combined at the combining; and sending, when an error is contained in a split signal stored in the split signal storing unit, a request to the transmitter to retransmit the retransmission signal, the transmitter performing a retransmission process on multiple signals by using multiple processes;

controlling decoded data associated with the split signal, from among decoded data stored in the decoded data storing unit and for which the error checking result stored in the check result storing unit does not indicate an error, such that the split signal is not updated and controlling decoded data associated with the split signal, from among decoded data stored in the decoded data storing unit and for which the error checking result stored in the check result storing unit indicates an error, such that the decoded data is updated to the decoded data decoded by the decoding;

controlling to update the signal, when a bank for storing the decoded data for the retransmission signal is not reserved in the decoded data storing unit; and controlling to update the decoded data when a bank for storing the decoded data for the retransmission signal is reserved in the decoded data storing unit.

7. A receiving apparatus comprising:
a processor; and
a memory, wherein the processor executes a process comprising:
splitting a received signal received from the transmitter into a predetermined size;
retaining split signals obtained at the splitting in a split signal storing unit;
performing error checking on each of the split signals stored in the split signal storing unit and retaining a result of the error checking in a check result storing unit;
combining, when a retransmission signal is received, a split signal obtained by splitting the retransmission signal at the splitting and a split signal stored in the split signal storing unit;
decoding the split signals stored in the split signal storing unit;
storing decoded data decoded by the decoding in a predetermined number of banks of a decoded data storing unit;
controlling, among the split signals stored in the split signal storing unit, not to update the split signal for which an error checking result does not indicate an error and controlling to update the split signal for which an error checking result indicates an error to a combined signal combined at the combining; and
sending, when an error is contained in a split signal stored in the split signal storing unit, a request to the transmitter to retransmit the retransmission signal, the transmitter performing a retransmission process on multiple signals by using multiple processes;
controlling decoded data associated with the split signal, from among decoded data stored in the decoded data storing unit and for which the error checking result stored in the check result storing unit does not indicate an error, such that the split signal is not updated and controlling decoded data associated with the split signal, from among decoded data stored in the decoded data storing unit and for which the error checking result stored in the check result storing unit indicates an error, such that the decoded data is updated to the decoded data decoded by the decoding;
controlling to update the signal, when a bank for storing the decoded data for the retransmission signal is not reserved in the decoded data storing unit; and
controlling to update the decoded data when a bank for storing the decoded data for the retransmission signal is reserved in the decoded data storing unit.

* * * * *